(12) United States Patent  (10) Patent No.: US 9,110,451 B2
Ogawa  (45) Date of Patent: Aug. 18, 2015

(54) MOTOR CONTROL SYSTEM AND SAFETY MONITORING SYSTEM THEREFOR

(75) Inventor: Kenji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 13/819,597

(22) PCT Filed: Nov. 11, 2010

(86) PCT No.: PCT/JP2010/070141
§ 371 (c)(1),
(2), (4) Date: Feb. 27, 2013

(87) PCT Pub. No.: WO2012/063352
PCT Pub. Date: May 18, 2012

(65) Prior Publication Data
US 2013/0154538 A1  Jun. 20, 2013

(51) Int. Cl.
G05B 23/02 (2006.01)
G05B 11/01 (2006.01)
G05B 19/4062 (2006.01)
H02P 29/02 (2006.01)

(52) U.S. Cl.
CPC .......... *G05B 11/011* (2013.01); *G05B 19/4062* (2013.01); *H02P 29/021* (2013.01); *H02P 29/027* (2013.01); *G05B 2219/41383* (2013.01); *G05B 2219/42306* (2013.01); *G05B 2219/42313* (2013.01); *G05B 2219/42318* (2013.01); *G05B 2219/42321* (2013.01)

(58) Field of Classification Search
USPC .......................................................... 318/565
See application file for complete search history.

(56) References Cited

U.S. PATENT DOCUMENTS

| 5,210,476 | A | 5/1993 | Kazato |
| 5,638,307 | A * | 6/1997 | Kamimura et al. ........... 713/321 |
| 6,526,324 | B1 * | 2/2003 | Kinoshita et al. .............. 700/52 |
| 6,822,417 | B2 | 11/2004 | Kawaji et al. |
| 7,994,798 | B2 * | 8/2011 | Williams et al. .............. 324/537 |
| 2004/0201358 | A1 | 10/2004 | Kawaji et al. |
| 2004/0232864 | A1 * | 11/2004 | Sunaga et al. ................ 318/434 |
| 2009/0091285 | A1 | 4/2009 | Hahn et al. |
| 2012/0176075 | A1 * | 7/2012 | Taka .............................. 318/685 |
| 2012/0187884 | A1 * | 7/2012 | Gaiser et al. .................. 318/490 |
| 2013/0193883 | A1 * | 8/2013 | Shitabou .................... 318/400.3 |
| 2014/0265960 | A1 * | 9/2014 | Sonoda ..................... 318/400.21 |

FOREIGN PATENT DOCUMENTS

CN  1516918 A  7/2004
EP  0462539 A1  12/1991
(Continued)

OTHER PUBLICATIONS

Communication dated Feb. 2, 2015, issued by the State Intellectual Property Office of the People's Republic of China in corresponding application No. 201080070110.5.

*Primary Examiner* — Kawing Chan
(74) *Attorney, Agent, or Firm* — Sughrue Mion, PLLC; Richard C. Turner

(57) ABSTRACT

Each of a host controller and a motor control apparatus included in a motor control system that drives a motor includes a step of determining, with respect to motor rotation state estimation information estimated based on an electric current and a voltage to the motor, whether an operation state of the motor is normal according to what kind of a relation an operation command output by the host controller and a detected motor position or motor speed have.

30 Claims, 14 Drawing Sheets

(56) References Cited

FOREIGN PATENT DOCUMENTS

| JP | 3-231317 A | 10/1991 |
| JP | 10-257668 A | 9/1998 |
| JP | 2003-33072 A | 1/2003 |
| JP | 2009-538114 A | 10/2009 |

* cited by examiner

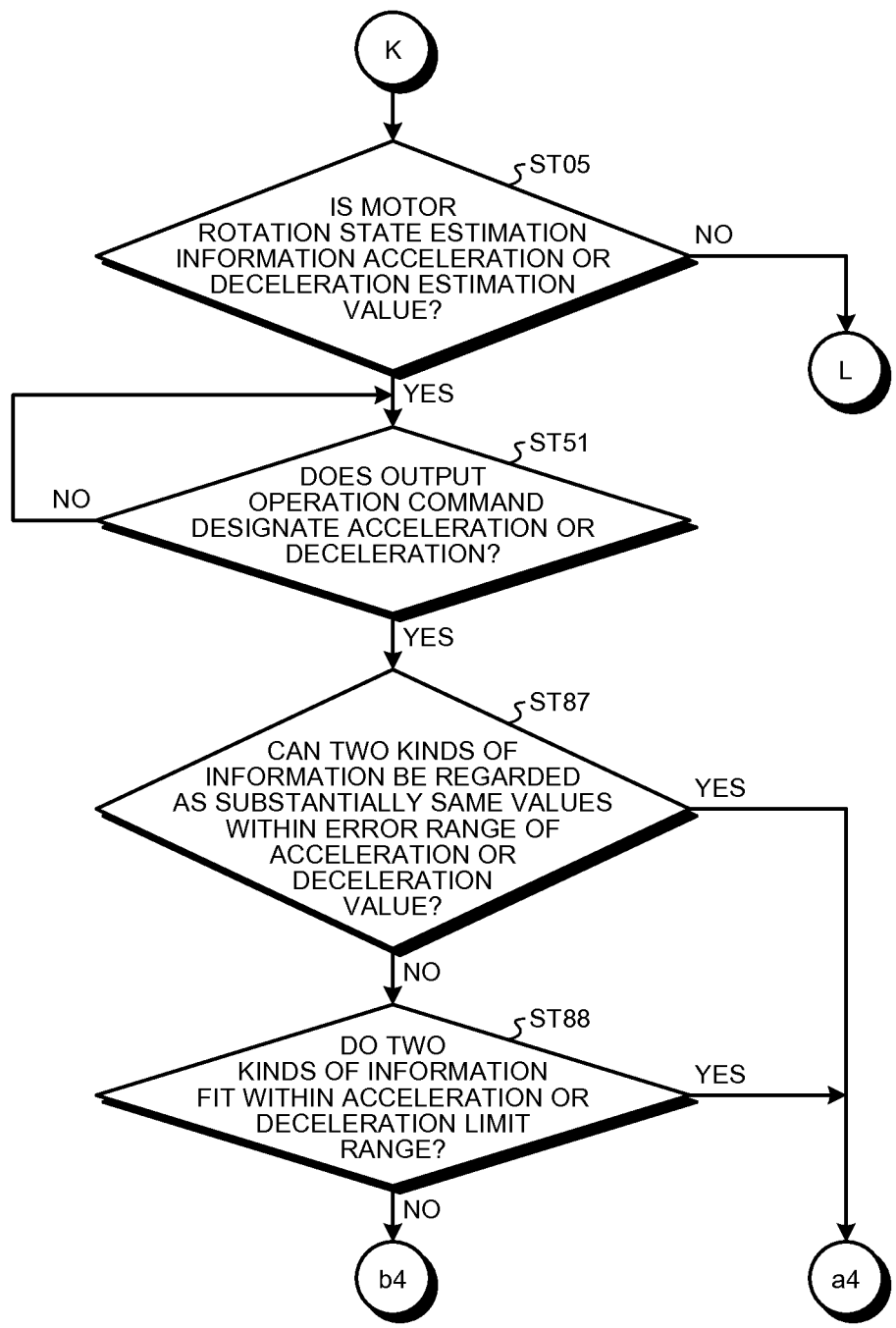

MOTOR CONTROL SYSTEM AND SAFETY MONITORING SYSTEM THEREFOR

CROSS REFERENCE TO RELATED APPLICATIONS

This application is a National Stage of International Application No. PCT/JP2010/070141 filed Nov. 11, 2010 the contents of all of which are incorporated herein by reference in their entirety.

FIELD

The present invention relates to a motor control system that subjects various machines to driving control and a safety monitoring method therefor.

BACKGROUND

A motor control system that subjects various machines to driving control includes a host controller and a motor control apparatus. The motor control apparatus drives motors of the various machines based on an operation command from the host controller and the positions and the speeds of the motors. As the motor control apparatus, there is a type for obtaining "the positions and the speeds of the motors" using outputs of detectors attached to the motors and a type for estimating "the positions and the speeds of the motors" from electric currents or voltages of the motors without using the detectors. When the motor control apparatus is a servo amplifier, as the servo amplifier, there is also a built-in positioning type.

In the motor control system, for example, when the various machines are machine tools, from the view point of safety, an operator cannot approach a work piece during motor rotation. For example, in a lathe, a safety fence is kept closed. The lathe is operated in a state in which an operator cannot approach the lathe not only when the lathe is in a high-speed range but also when the lathe is in a low-speed range.

However, actually, for example, during replacement of work, to enable the operator to check a work position, it is necessary to rotate the work in a state in which the safety fence is opened. In this case, it is requested to detect, with high reliability, whether the number of revolutions is actually within a safety range.

To meet this request, a dedicated apparatus for monitoring rotating speed is necessary separately from the motor control apparatus. However, an increase in costs is inevitable. To add the apparatus after the system is once assembled, the entire system needs to be reviewed. Therefore, the addition of the apparatus is practically often impossible.

To solve this problem, various measures for securing safety of the motor control apparatus have been proposed (e.g., Patent Literatures 1 and 2).

Patent Literature 1 proposes a method of predicting current motor speed from a command pattern using a control system model, which simulates a transfer function of a control system, and comparing the predicted current motor speed and motor speed detected by a speed detector to thereby determine abnormality.

Patent Literature 2 proposes, as a method of multiply monitoring a motor rotation state using a plurality of kinds of information, a method of monitoring the motor rotation state using information (the position, the speed, and the magnetic pole position of the motor) from a detector and information concerning a motor rotation state estimated from an induced voltage generated in winding of the motor.

CITATION LIST

Patent Literature

Patent Literature 1: Japanese Patent Application Laid-open No. 3-231317
Patent Literature 2: Japanese Patent Application Laid-open No. 2003-033072

SUMMARY

Technical Problem

However, in the safety monitoring method disclosed in Patent Literature 1, there is a problem in that speed monitoring cannot be performed when abnormality occurs in the speed detector. If a speed detector is separately prepared to solve the problem, because additional wiring is also necessary, an increase in costs is caused.

In the safety monitoring method disclosed in Patent Literature 2, an induced voltage detector is used as means for estimating the motor rotation state. However, the induced voltage generated in the motor winding decreases during motor low-speed operation. Therefore, in the method in which the induced voltage detector is used, there is a problem in that the motor rotation state cannot be detected correctly. Because the induced voltage detector is used for safety monitoring, additional wiring is necessary, so that like the safety monitoring method disclosed in Patent Literature 1, an increase in costs is caused.

As disclosed in Patent Literatures 1 and 2, in the past, the motor control apparatus itself is configured to perform safety monitoring of the own apparatus. However, in the motor control system, a practical effect of safety monitoring can be further realized if the host controller can also be configured to be capable of performing safety monitoring for the motor control apparatus. It goes without saying that contrivance for not causing an addition or a change in the configuration in the past is necessary.

The present invention has been devised in view of the above and it is an object of the present invention to obtain a motor control system in which a host controller can also perform safety monitoring for a motor control apparatus without causing an addition or a change in the configuration in the past and a safety monitoring system for the motor control system.

Solution to Problem

In order to solve the aforementioned problems, a motor control system according to one aspect of the present invention is configured in such a manner that it includes: a host controller configured to output an operation command; and a motor control apparatus configured to drive a motor based on a motor position and motor speed obtained by calculating, from one of a motor position and motor speed detected by a position detector and a speed detector attached to the motor, the other of the motor position and the motor speed and an operation command from the host controller, wherein the host controller includes a safety monitoring unit configured to determine, with respect to motor rotation state estimation information input from the motor control apparatus, whether an operation command output to the motor control apparatus and a motor position input from the motor control apparatus or, if motor speed is input from the motor control apparatus, a motor position calculated from the motor speed or motor speed input from the motor control apparatus or, if a motor position is input from the motor control apparatus, motor speed calculated from the motor position can be regarded as same within an error range or whether the operation command and the motor position or the motor speed are within a limit range, and the motor control apparatus includes: a motor-rotation-state estimating unit configured to output the motor rotation state estimation information estimated based on an electric current and a voltage to the motor; and a safety monitoring unit configured to determine, with respect to the motor rotation state estimation information output by the motor-rotation-state estimating unit, whether an operation state of the motor is normal according to whether an operation command from the host controller and the detected motor position or a motor position calculated from the detected motor speed or the detected motor speed or motor speed calculated from the detected motor position can be regarded as same within an error range or whether the operation command and the motor position or the motor speed are within a limit range.

Advantageous Effects of Invention

According to the present invention, the host controller can also perform safety monitoring for the motor control apparatus. Therefore, it is possible to realize a practical effect of safety monitoring for the motor control system. Because a plurality of kinds of monitoring information can be prepared to multiply monitor a motor operation state, it is possible to improve reliability of safety monitoring. Further, because safety monitoring can be performed without causing an addition or a change in the configuration in the past, there is an effect that additional wiring is unnecessary and it is possible to shift to the motor control system with high safety while keeping the configuration in the past.

BRIEF DESCRIPTION OF DRAWINGS

FIG. 14 is a flowchart for explaining a third safety monitoring method with which the host controller carries out safety monitoring for the motor control apparatus.

DESCRIPTION OF EMBODIMENTS

Embodiments of a motor control system and a safety monitoring method therefor according to the present invention are explained in detail below based on the drawings. The present invention is not limited by the embodiments.

First Embodiment

Figure 1:
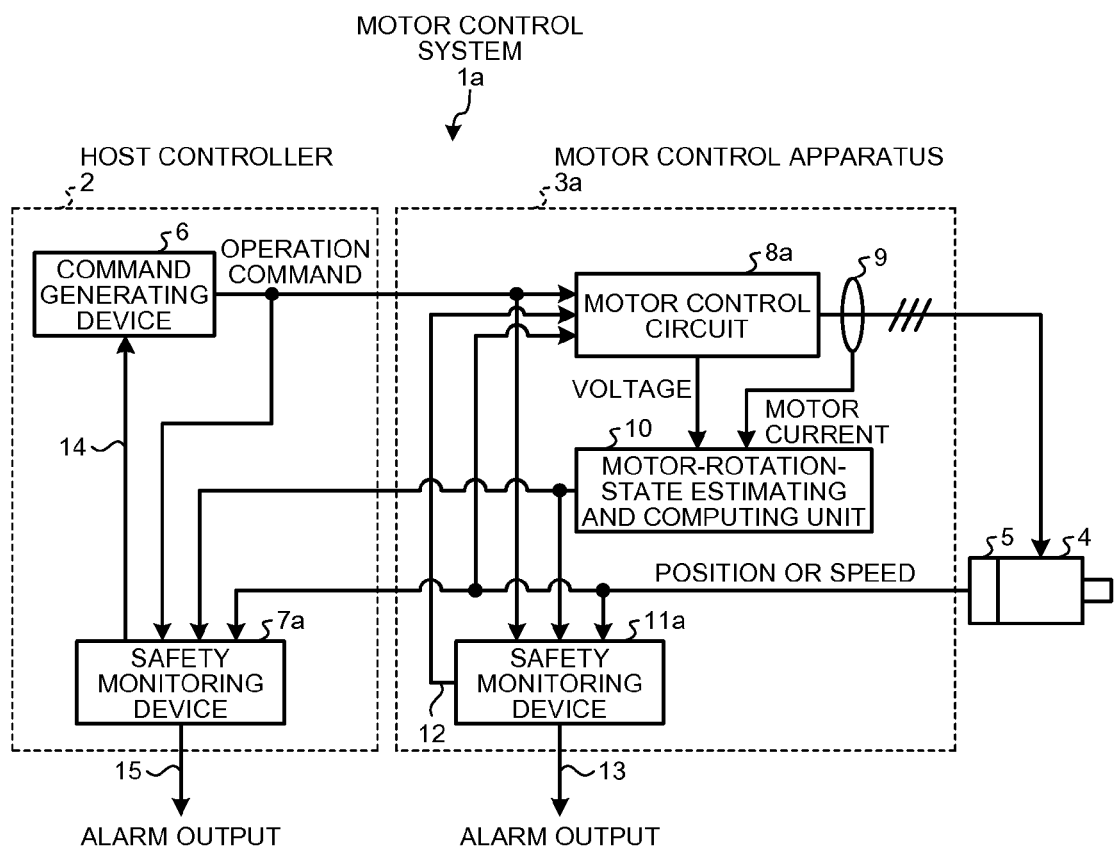
FIG. 1 is a block diagram of an overall configuration of a motor control system according to a first embodiment of the present invention.

FIG. 1 is a block diagram of an overall configuration of a motor control system according to a first embodiment of the present invention. In FIG. 1, a motor control system 1a includes a host controller 2 and a motor control apparatus 3a. In this embodiment, the motor control system 1a is a servo system. Therefore, the motor control apparatus 3a is a servo amplifier. Detectors 5 are arranged directly in motors 4 of various machines or in the vicinity of the motors 4. The detector 5 is a position detector or a speed detector that detects the position or the speed of the motor 4. The position or the speed detected by the detector 5 is input to the motor control apparatus 3a and the host controller 2.

In the host controller 2, a command generating device 6 and a safety monitoring device 7a are extracted and shown. Although not shown in the figure, a signal indicating operability of the motor control apparatus 3a is input to the host controller 2. When the motor control apparatus 3a is in an operable state, the command generating device 6 generates operation commands (a position command, a speed command, and a torque command) for designating various operations corresponding to control modes for "position control", "speed control", and "torque control" and outputs the operation commands to the motor control apparatus 3a. A state in which the motor control apparatus 3a is inoperable is, for example, a state in which the motor control apparatus 3a is not sufficiently started up after a power supply is turned on or a state in which the motor control apparatus 3a is in emergency stop. As explained below, the safety monitoring device 7a monitors a safety state of the motor control apparatus 3a.

In the motor control apparatus 3a, a motor control circuit 8a, a current detecting circuit 9, a motor-rotation-state estimating and computing unit 10, and a safety monitoring device 11a are extracted and shown.

The motor control circuit 8a drives the motor 4 based on an operation command from the host controller 2 and a motor position and motor speed obtained by calculating, from one of a motor position and motor speed respectively detected by a position detector 5 and a speed detector 5, the other of the motor position and the motor speed. The current detecting circuit 9 detects a motor current supplied to the motor 4 by the motor control circuit 8a.

The motor-rotation-state estimating and computing unit 10 estimates and computes rotation states of the motor 4 in the three control modes based on the motor current detected by the current detecting circuit 9 and a voltage supplied from the motor control circuit 8a to the motor 4. In this embodiment, in motor rotation state estimation information output by the motor-rotation-state estimating and computing unit 10, a motor position estimation value, a zero speed estimation state, an estimated rotating direction, a motor speed estimation value, and a motor acceleration estimation value are monitoring targets. It goes without saying that details of the monitoring targets are different depending on a control mode. However, in this embodiment, because the concept of the safety monitoring method is explained, there is no reference to the difference of the details.

Each of the safety monitoring devices 7a and 11a multiply monitors, in the three control modes, a safety state of the motor control apparatus 3a using a position or speed detected by the detector 5, motor rotation state estimation information output by the motor-rotation-state estimating and computing unit 10, and an operation command output by the command generating device 6.

When the detector 5 is the position detector, if an operation command is a command for performing designation concerning "speed" such as designation for zero speed, a rotating direction, speed, or acceleration or deceleration, the safety monitoring devices 7a and 11a calculate the "speed" from a position detected by the position detector 5. When the detector 5 is the speed detector, if the operation command designates "position", the safety monitoring devices 7a and 11a calculate the "position" from speed detected by the speed detector 5.

The safety monitoring devices 7a and 11a include, concerning these three kinds of information, for each of the three control modes, a table in which an error range is stored and a table in which a limit range is stored. The safety monitoring devices 7a and 11a check, referring to these tables, whether the three kinds of information are consistent or inconsistent and whether the three kinds of information are within limit ranges and output monitoring result signals 12 and 14. The monitoring result signals 12 and 14 are input to the motor control circuit 8a and the command generating device 6 as control signals. The motor control circuit 8a and the command generating device 6 continue operations when the monitoring result signals 12 and 14 indicate a normal state and stop the operations when the monitoring result signals 12 and 14 indicate an abnormal state. The safety monitoring devices 7a and 11a are configured to, when outputting the monitoring result signals 12 and 14 indicating the abnormal state, perform alarm outputs 13 and 15 to an operation panel, a monitoring panel, or the like not shown in the figure and warn people around the system of occurrence of abnormality. As a method for the warning, besides buzzer sounding, display of an apparatus that causes the operation stop can also be performed.

A safety monitoring method according to the first embodiment is explained with reference to FIGS. 2 to 7. In flowcharts shown in FIGS. 2 to 7, a procedure of safety monitoring operation performed in any one of the three control modes is shown. In FIGS. 2 to 7, a step indicating a processing procedure is abbreviated as "ST".

Safety Monitoring Method in the Motor Control Apparatus 3a

Figure 2:
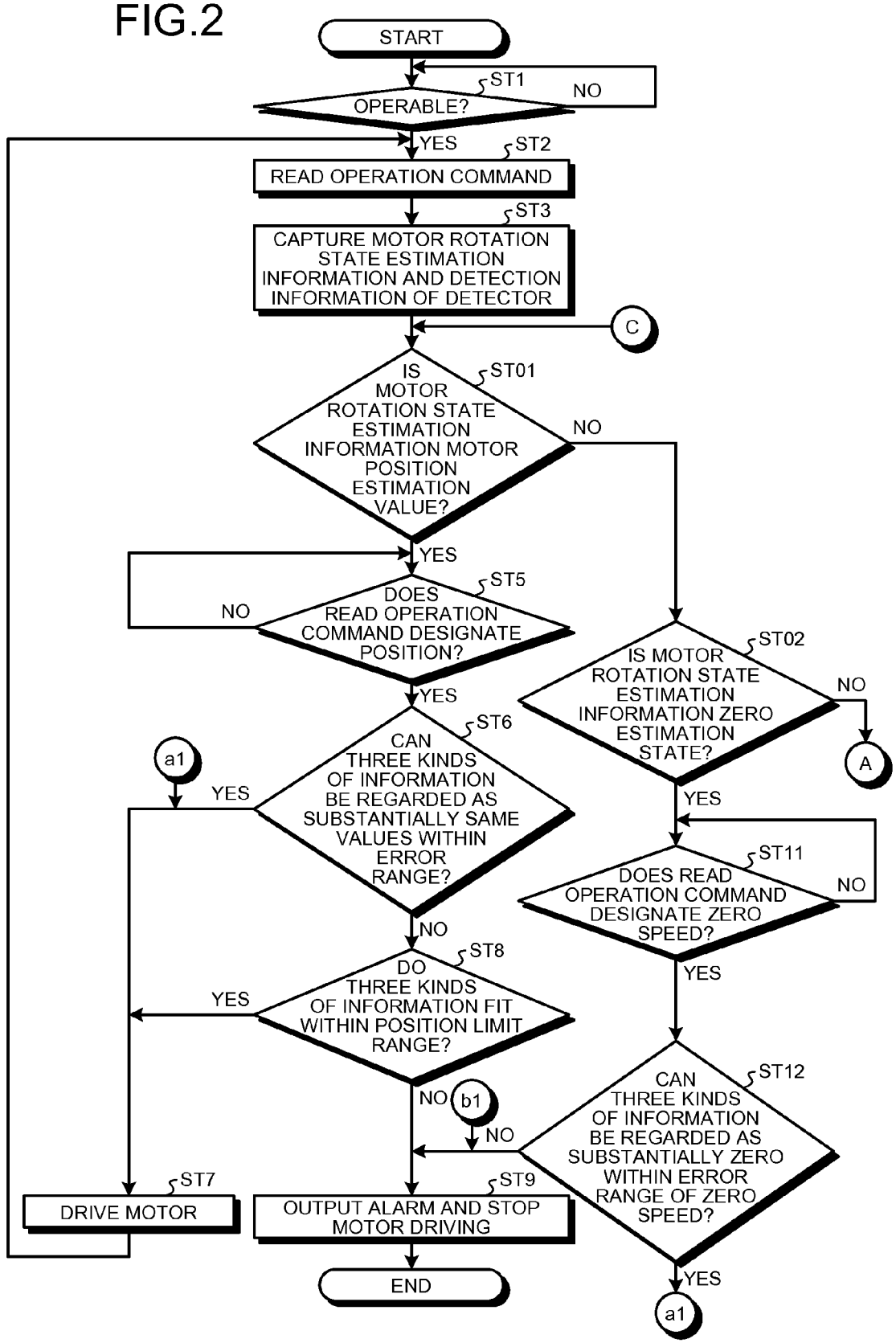
FIG. 2 is a flowchart for explaining a first safety monitoring method carried out by a motor control apparatus for the own apparatus.
Figure 3:
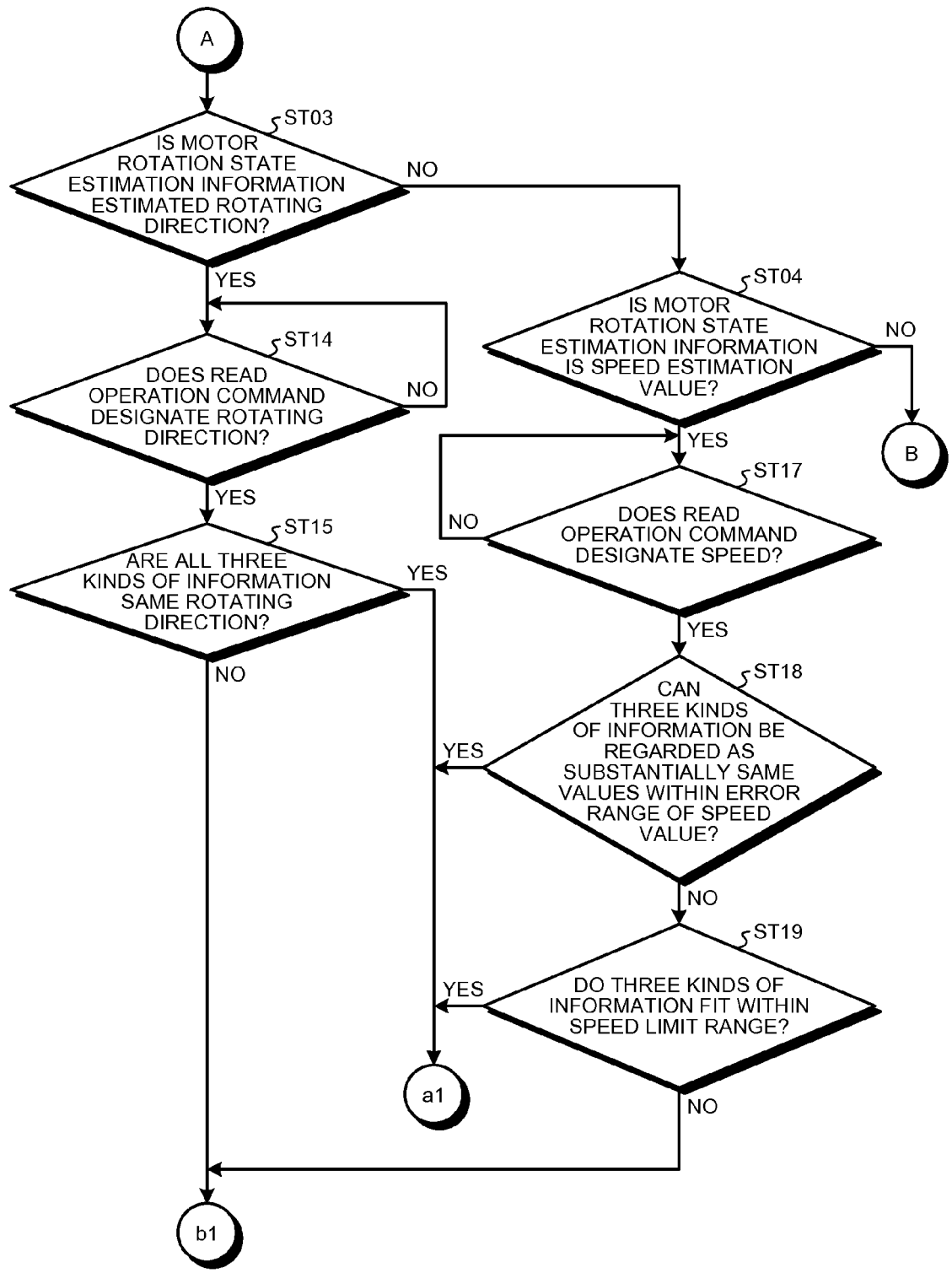
FIG. 3 is a flowchart for explaining a second safety monitoring method carried out by the motor control apparatus for the own apparatus.
Figure 4:
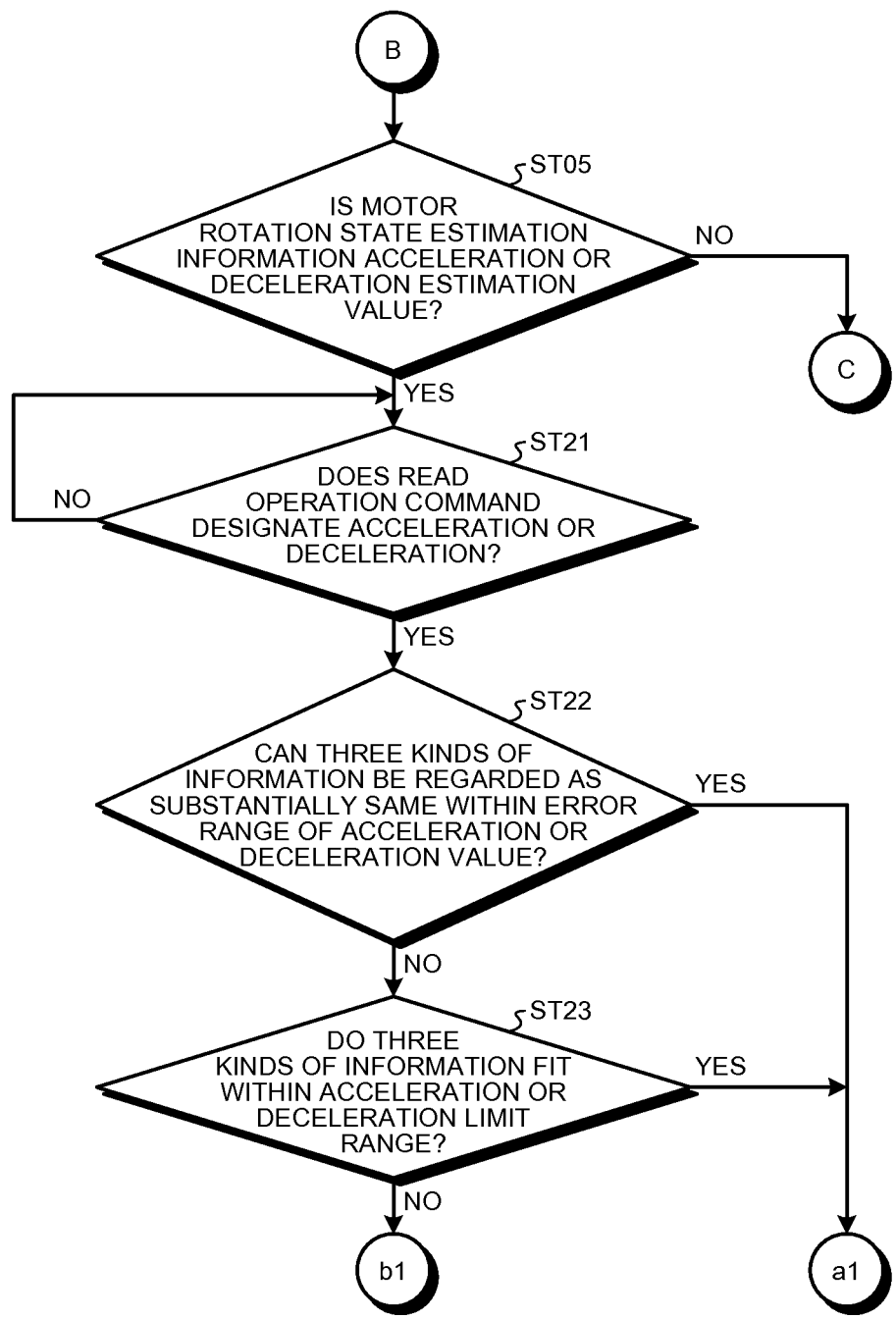
FIG. 4 is a flowchart for explaining a third safety monitoring method carried out by the motor control apparatus for the own apparatus.

FIGS. 2 to 4 are flowcharts for explaining a safety monitoring method carried out by the motor control apparatus 3a for the own apparatus. In FIGS. 2 to 4, when the motor control apparatus 3a is in the operable state (Yes at ST1), the host controller 2 outputs an operation command corresponding to a control mode to the motor control apparatus 3a. Therefore, the safety monitoring device 11a reads the operation command from the host controller 2 (ST2). In parallel, the safety monitoring device 11a captures motor rotation state estimation information output by the motor-rotation-state estimating and computing unit 10 and detection information of the detector 5 (ST3).

Capturing the detection information of the detector 5 means temporarily storing a motor position and motor speed detected by the detector 5 in a register while updating the motor position and the motor speed one by one. The detected motor position indicates a motor position detected by the detector 5 when the detector 5 is the position detector and a motor position calculated by the detector 5 from the detected motor speed when the detector 5 is the speed detector. The detected motor speed indicates motor speed detected by the detector 5 when the detector 5 is the speed detector and motor speed calculated from the detected motor position when the detector 5 is the position detector.

The safety monitoring device 11a determines whether an operation state of the motor 4 is normal respectively (1) when the captured motor rotation state estimation information is a motor position estimation value (Yes at ST01), (2) when the captured motor rotation state estimation information is a zero speed estimation speed (Yes at ST02), (3) when the captured motor rotation state estimation information is an estimated rotating direction (Yes at ST03), (4) when the captured motor rotation state estimation information is a speed estimation value (Yes at ST04), and (5) when the captured motor rotation state estimation information is an acceleration or deceleration estimation value (Yes at ST05). The safety monitoring device 11a repeats the determination. The determinations in the steps are explained below in order.

(1) When the motor rotation state estimation information is the motor position estimation value (Yes at ST01), the safety monitoring device 11a confirms that the read operation command designates a position (Yes at ST5) and determines whether "three kinds of information" including the motor position estimation value, the position designated by the read operation command, and a detected position can be regarded as substantially the same values within an error range of a position (ST6). As a result, when the "three kinds of information" can be regarded as substantially the same values (Yes at ST6), the safety monitoring device 11a determines that the position of the motor 4 is a normal position and returns to ST2 via ST7. When the "three kinds of information" cannot be regarded as substantially the same values (No at ST6), the safety monitoring device 11a determines whether the "three kinds of information" fit within a position limit range (ST8). As a result, when the "three kinds of information" fit within the position limit range (Yes at ST8), the safety monitoring device 11a determines that the position of the motor 4 is the normal position and returns to ST2 via ST7. When the "three kinds of information" do not fit within the position limit range (No at ST8), the safety monitoring device 11a performs processing at ST9 and ends this procedure.

At ST7, the safety monitoring device 11a sets the monitoring result signal 12, which is output to the motor control circuit 8a, to a signal level indicating a "normal state" and causes the motor control circuit 8a to continue the operation of the motor 4. At ST9, the safety monitoring device 11a sets the monitoring result signal 12, which is output to the motor control circuit 8a, to a signal level indicating an "abnormal state" and causes the motor control circuit 8a to emergently stop the motor 4. At the same time, the safety monitoring device 11a performs the alarm output 13 on, for example, a not-shown monitoring panel of the motor control apparatus 3a.

(2) When the motor rotation state estimation information is the zero speed estimation state (Yes at ST02), the safety monitoring device 11a confirms that the read operation command designates zero speed (Yes at ST11) and determines whether "three kinds of information" including the zero speed estimation state, the zero speed designated by the read operation command, and zero speed indicated by detected speed can be regarded as substantially zero within an error range of zero speed (ST12). As a result, when the "three kinds of information" can be regarded as substantially zero within the error range of zero speed (Yes at ST12), the safety monitoring device 11a determines that a stop state of the motor 4 is a normal stop state and returns to ST2 via ST7. When the "three kinds of information" are not within the error range of zero speed and cannot be regarded as substantially zero (No at ST12), the safety monitoring device 11a performs the processing at ST9 and ends this procedure.

(3) When the motor rotation state estimation information is the estimated rotating direction (Yes at ST03), the safety monitoring device 11a confirms that the read operation command designates a rotating direction (Yes at ST14) and determines whether all of "three kinds of information" including the estimated rotating direction, the rotating direction designated by the read operation command, and a rotating direction indicated by the detected speed are the same rotating direction (ST15). As a result, when all of the "three kinds of information" are the same rotating direction (Yes at ST15), the safety monitoring device 11a determines that the rotating direction of the motor 4 is a normal rotating direction and returns to ST2 via ST7. When all of the "three kinds of information" are not the same rotating direction (No at ST15), the safety monitoring device 11a performs the processing at ST9 and ends this procedure.

(4) When the motor rotation state estimation information is the speed estimation value (Yes ST04), the safety monitoring device 11a confirms that the read operation command designates speed (Yes at ST17) and determines whether "three kinds of information" including the speed estimation value, a value of the speed designated by the read operation command, and a value of the detected speed can be regarded as substantially the same values within an error range of a speed value (ST18). As a result, when the "three kinds of information" can be regarded as substantially the same values within the error range of a speed value (Yes at ST18), the safety monitoring device 11a determines that a speed value of the motor 4 is a normal speed value and returns to ST2 via ST7. When the "three kinds of information" are not within the error range of a speed value and cannot be regarded as substantially the same values (No at ST18), then the safety monitoring device 11a determines whether the "three kinds of information" fit within a speed limit range (ST19). As a result, when the "three kinds of information" fit within the speed limit range (Yes at ST19), the safety monitoring device 11a determines that the speed value of the motor 4 is the normal speed value and returns to ST2 via ST7. When the "three kinds of information" do not fit within the speed limit range (No at ST19), the safety monitoring device 11a performs the processing at ST9 and ends this procedure.

(5) When the motor rotation state estimation information is the acceleration or deceleration estimation value (Yes at ST05), the safety monitoring device 11a confirms that the read operation command designates acceleration or deceleration (Yes at ST21) and determines whether "three kinds of information" including the acceleration or deceleration estimation value, a value of the acceleration or deceleration designated by the read operation command, and a value of acceleration or deceleration indicated by the detected speed can be regarded as substantially the same values within an error range of an acceleration or deceleration value (ST22). As a result, when the "three kinds of information" can be regarded as substantially the same values within the error range of an acceleration or deceleration value (Yes at ST22), the safety monitoring device 11a determines that an acceleration or deceleration value of the motor 4 is a normal speed value and returns to ST2 via ST7. When the "three kinds of information" are not within the error range of an acceleration or deceleration value and cannot be regarded as substantially the same values (No at ST22), then the safety monitoring device 11a determines whether the "three kinds of information" fit within an acceleration or deceleration limit range (ST23). As a result, when the "three kinds of information" fit within the acceleration or deceleration limit range (Yes at ST23), the safety monitoring device 11a determines that the acceleration or deceleration value of the motor 4 is a normal speed value and returns to ST2 via ST7. When the "three kinds of information" do not fit within the acceleration or deceleration limit range (No at ST23), the safety monitoring device 11a performs the processing at ST9 and ends this procedure. When the motor rotation state estimation information is not the acceleration or deceleration estimation value (No at ST05), the safety monitoring device 11a returns to ST01 and repeats the monitoring operation explained above.

The safety monitoring device 11a is configured to perform, when performing the processing at ST9, determinations of (a) to (e) explained below for each two kinds of information of the "three kinds of information" to specify an apparatus that causes abnormality and display the apparatus on, for example, the monitoring panel of the motor control apparatus 3a.

(a) When the motor rotation state estimation information and the read operation command can be regarded as the same within the error range, the safety monitoring device 11a determines that the detector 5 is out of order. (b) When the motor rotation state estimation information and the detected motor position or the motor position calculated from the detected motor speed can be regarded as the same within the error range, the safety monitoring device 11a determines that abnormality has occurred in the read operation command. (c) When the motor rotation state estimation information and the detected motor speed or the motor speed calculated from the detected motor position can be regarded as the same within the error range, the safety monitoring device 11a determines that abnormality has occurred in the read operation command. (d) When the read operation command and the detected motor position or the motor position calculated from the detected motor speed can be regarded as the same within the error range, the safety monitoring device 11a determines that abnormality has occurred in the current detecting circuit 9. (e) When the read operation command and the detected motor speed or the motor speed calculated from the detected motor position can be regarded as the same within the error range, the safety monitoring device 11a determines that abnormality has occurred in the current detecting circuit 9.

Safety Monitoring Method Carried Out by the Host Controller 2

Figure 5:
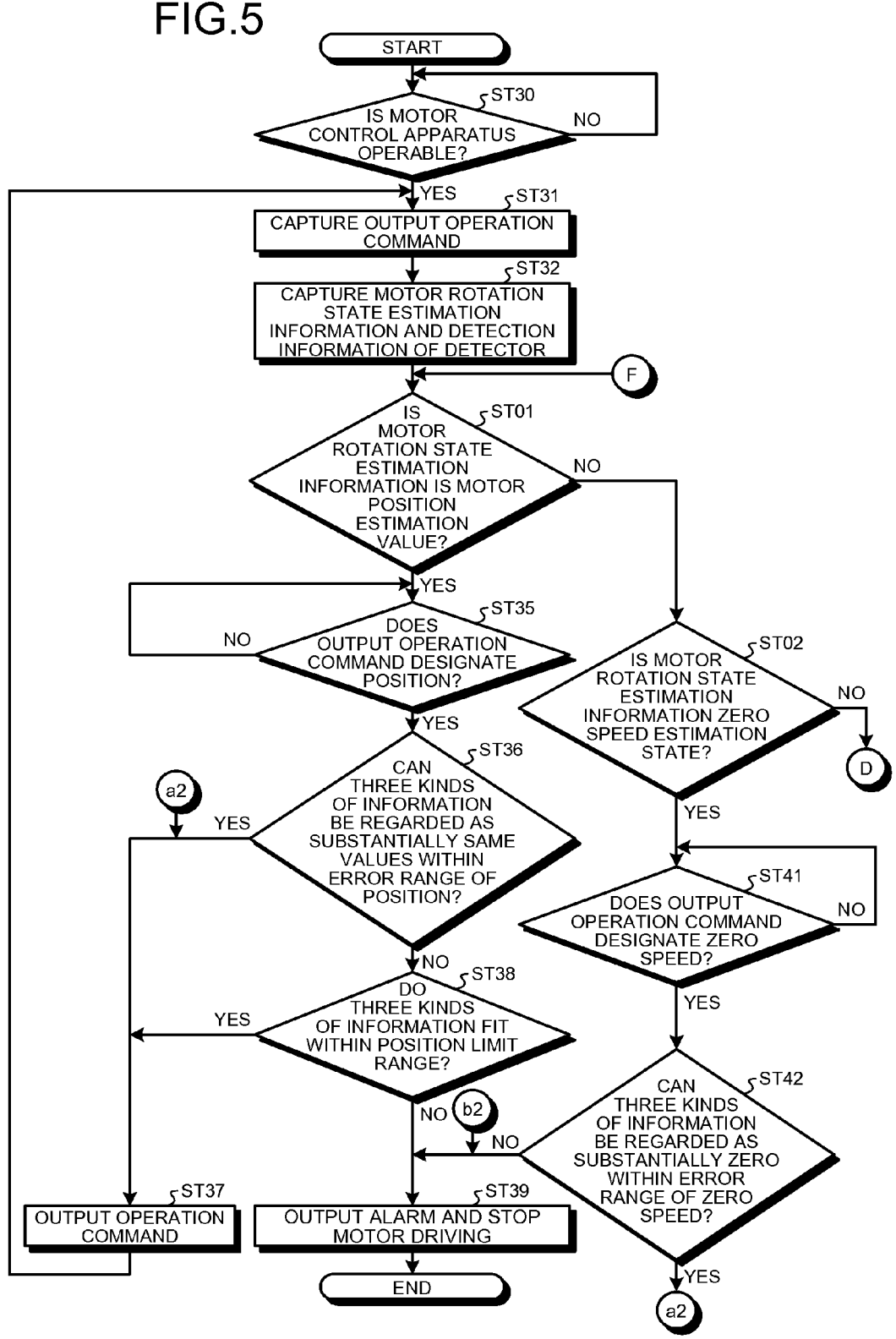
FIG. 5 is a flowchart for explaining a first safety monitoring method with which a host controller carries out safety monitoring for the motor control apparatus.
Figure 6:
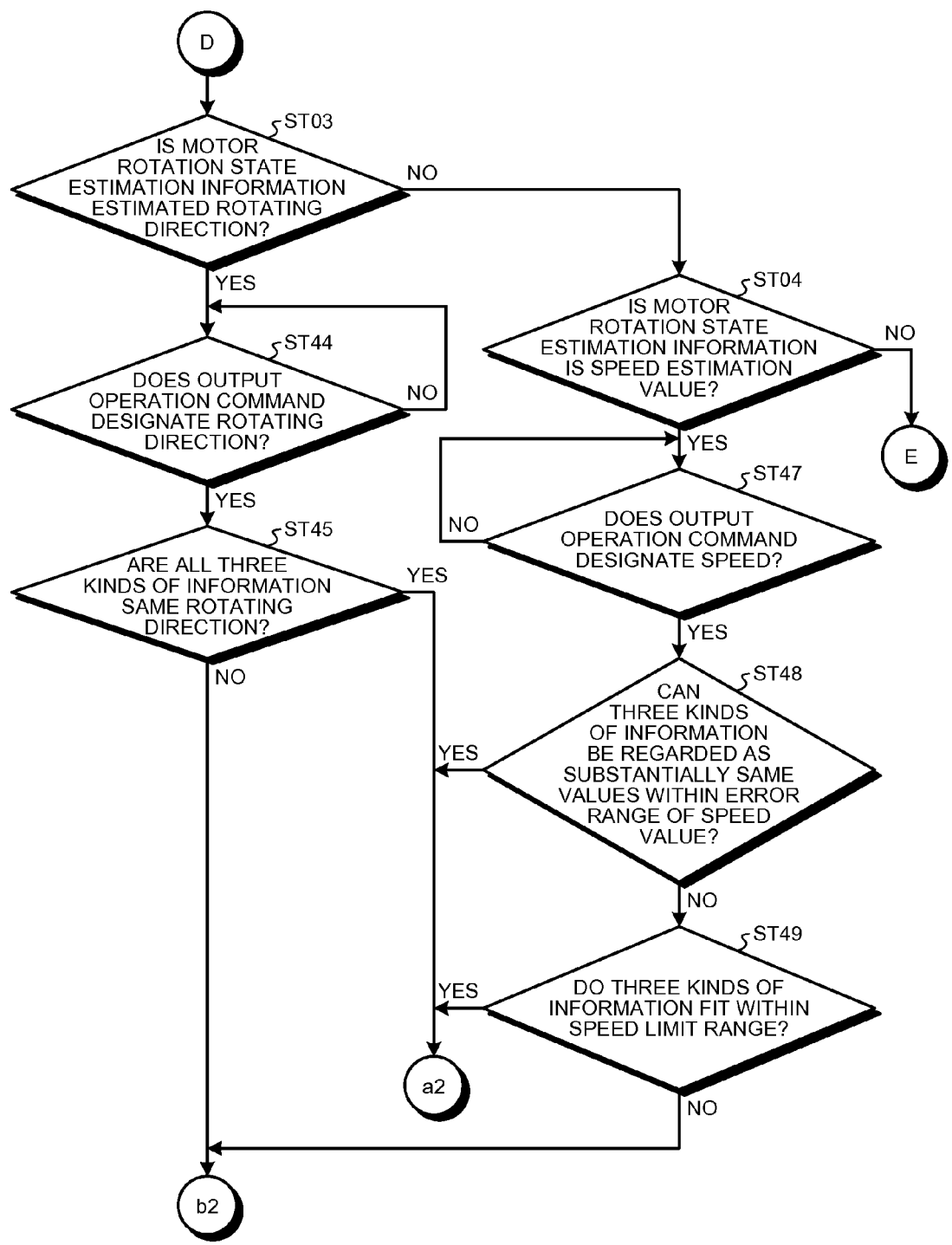
FIG. 6 is a flowchart for explaining a second safety monitoring method with which the host controller carries out safety monitoring for the motor control apparatus.
Figure 7:
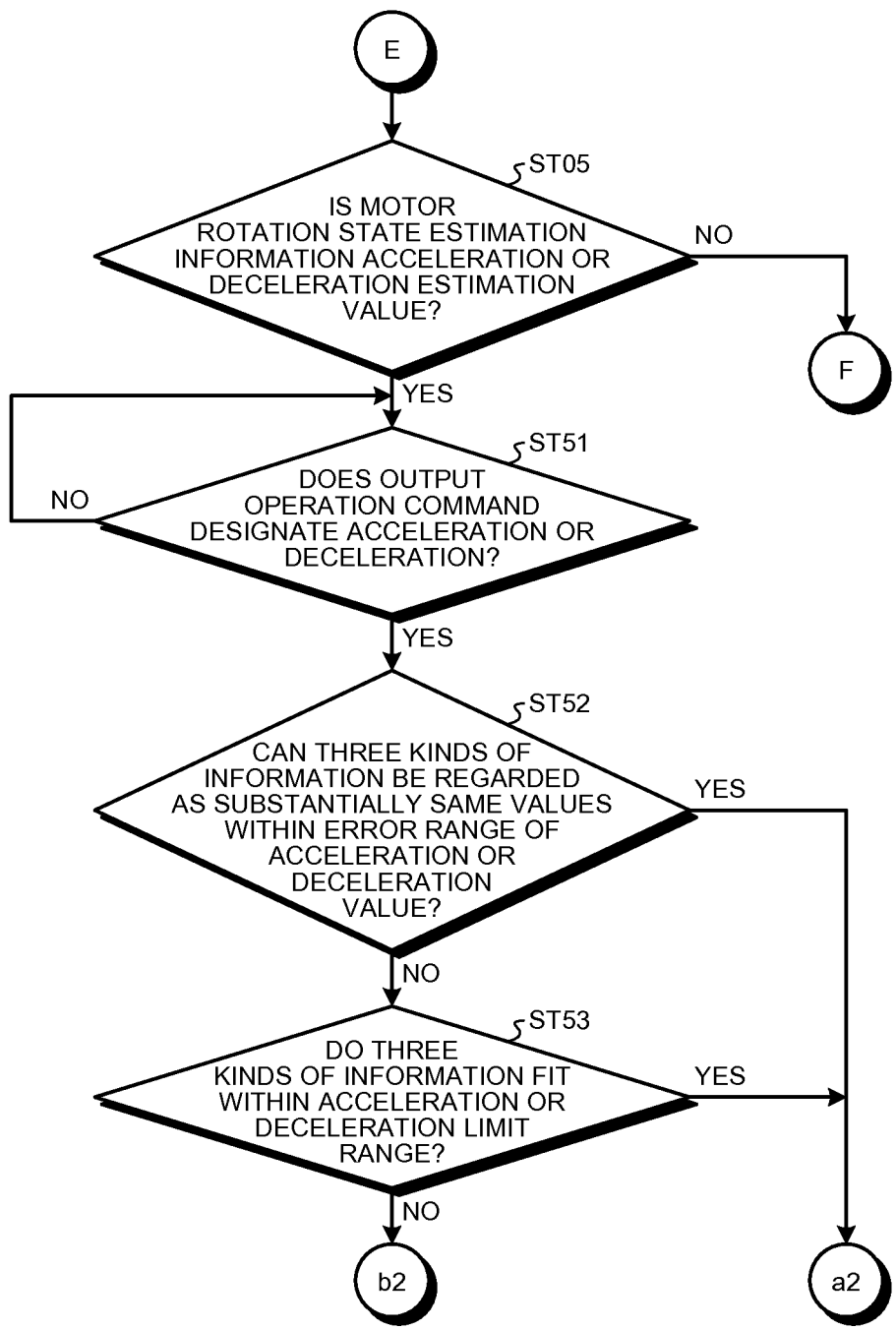
FIG. 7 is a flowchart for explaining a third safety monitoring method with which the host controller carries out safety monitoring for the motor control apparatus.

FIGS. 5 to 7 are flowcharts for explaining a safety monitoring method with which the host controller 2 carries out safety monitoring for the motor control apparatus 3a. In FIGS. 5 to 7, the host controller 2 confirms that the motor control apparatus 3a is in an operable state (Yes at ST30) and outputs an operation command corresponding to a control mode to the motor control apparatus 3a. Therefore, the safety monitoring device 7a captures the output operation command (ST31). In parallel, the safety monitoring device 7a captures, from the motor control apparatus 3a, motor rotation state estimation information output by the motor-rotation-state estimating and computing unit 10 and detection information of the detector 5 (ST32).

The safety monitoring device 7a determines, with a method same as the method carried out by the safety monitoring device 11a, whether an operation state of the motor 4 is normal respectively (1) when the motor rotation state estimation information captured from the motor control apparatus 3a is a motor position estimation value (Yes at ST01), (2) when the captured motor rotation state estimation information is a zero speed estimation speed (Yes at ST02), (3) when the captured motor rotation state estimation information is an estimated rotating direction (Yes at ST03), (4) when the captured motor rotation state estimation information is a speed estimation value (Yes at ST04), and (5) when the captured motor rotation state estimation information is an acceleration or deceleration estimation value (Yes at ST05). The safety monitoring device 7a repeats the determination. The determinations in the steps are explained below in order.

(1) When the motor rotation state estimation information captured from the motor control apparatus 3a is the motor position estimation value (Yes at ST01), the safety monitoring device 7a confirms that the output operation command designates a position (Yes at ST35) and determines whether "three kinds of information" including the motor position estimation value captured from the motor control apparatus 3a, the position designated by the output operation command, and a detected position captured from the motor control apparatus 3a can be regarded as substantially the same values within an error range of a position (ST36). As a result, when the "three kinds of information" can be regarded as substantially the same values (Yes at ST36), the safety monitoring device 7a determines that the position of the motor 4 is a normal position and returns to ST31 via ST37. When the "three kinds of information" cannot be regarded as substantially the same values (No at ST36), the safety monitoring device 7a determines whether the "three kinds of information" fit within a position limit range (ST38). As a result, when the "three kinds of information" fit within the position limit range (Yes at ST38), the safety monitoring device 7a determines that the position of the motor 4 is the normal position and returns to ST31 via ST37. When the "three kinds of information" do not fit within the position limit range (No at ST38), the safety monitoring device 7a performs processing at ST39 and ends this procedure.

At ST37, the safety monitoring device 7a sets the monitoring result signal 14, which is output to the command generating device 6, to a signal level indicating a "normal state" and causes the command generating device 6 to continue the generation of an operation command. Consequently, the motor control apparatus 3a continues the operation of the motor 4. At ST39, the safety monitoring device 7a sets the monitoring result signal 14, which is output to the command generating device 6, to a signal level indicating an "abnormal state" and causes the command generating device 6 to stop the operation for generating an operation command. Consequently, the motor control apparatus 3a stops the operation of the motor 4. At the same time, the safety monitoring device 7a performs the alarm output 15 on, for example, a not-shown monitoring panel of the host controller 2.

(2) When the motor rotation state estimation information captured from the motor control apparatus 3a is the zero speed estimation state (Yes at ST02), the safety monitoring device 7a confirms that the output operation command designates zero speed (Yes at ST41) and determines whether "three kinds of information" including the zero speed estimation state captured from the motor control apparatus 3a, the zero speed designated by the output operation command, and zero speed indicated by detected speed captured from the motor control apparatus 3a can be regarded as substantially zero within an error range of zero speed (ST42). As a result, when the "three kinds of information" can be regarded as substantially zero within the error range of zero speed (Yes at ST42), the safety monitoring device 7a determines that a stop state of the motor 4 is a normal stop state and returns to ST31 via ST37. When the "three kinds of information" are not within the error range of zero speed and cannot be regarded as substantially zero (No at ST42), the safety monitoring device 7a performs the processing at ST39 and ends this procedure.

(3) When the motor rotation state estimation information captured from the motor control apparatus 3a is the estimated rotating direction (Yes at ST03), the safety monitoring device 7a confirms that the output operation command designates a rotating direction (Yes at ST44) and determines whether all of "three kinds of information" including the estimated rotating direction captured from the motor control apparatus 3a, the rotating direction designated by the output operation command, and a rotating direction indicated by the detected speed captured from the motor control apparatus 3a are the same rotating direction (ST45). As a result, when all of the "three kinds of information" are the same rotating direction (Yes at ST45), the safety monitoring device 7a determines that the rotating direction of the motor 4 is a normal rotating direction and returns to ST31 via ST37. When all of the "three kinds of information" are not the same rotating direction (No at ST45), the safety monitoring device 11a performs the processing at ST39 and ends this procedure.

(4) When the motor rotation state estimation information captured from the motor control apparatus 3a is the speed estimation value (Yes ST04), the safety monitoring device 7a confirms that the output operation command designates speed (Yes at ST47) and determines whether "three kinds of information" including the speed estimation value captured from the motor control apparatus 3a, a value of the speed designated by the output operation command, and a value of the detected speed captured from the motor control apparatus 3a can be regarded as substantially the same values within an error range of a speed value (ST48). As a result, when the "three kinds of information" can be regarded as substantially the same values within the error range of a speed value (Yes at ST48), the safety monitoring device 7a determines that a speed value of the motor 4 is a normal speed value and returns to ST31 via ST37. When the "three kinds of information" are not within the error range of a speed value and cannot be regarded as substantially the same values (No at ST48), then the safety monitoring device 7a determines whether the "three kinds of information" fit within a speed limit range (ST49). As a result, when the "three kinds of information" fit within the speed limit range (Yes at ST49), the safety monitoring device 7a determines that the speed value of the motor 4 is the normal speed value and returns to ST31 via ST37. When the "three kinds of information" do not fit within the speed limit range (No at ST49), the safety monitoring device 7a performs the processing at ST39 and ends this procedure.

(5) When the motor rotation state estimation information captured from the motor control apparatus 3a is the acceleration or deceleration estimation value (Yes at ST05), the safety monitoring device 7a confirms that the output operation command designates acceleration or deceleration (Yes at ST51) and determines whether "three kinds of information" including the acceleration or deceleration estimation value captured from the motor control apparatus 3a, a value of the acceleration or deceleration designated by the output operation command, and a value of acceleration or deceleration indicated by the detected speed captured from the motor control apparatus 3a can be regarded as substantially the same values within an error range of an acceleration or deceleration value (ST52). As a result, when the "three kinds of information" can be regarded as substantially the same values within the error range of an acceleration or deceleration value (Yes at ST52), the safety monitoring device 7a determines that an acceleration or deceleration value of the motor 4 is a normal acceleration or deceleration value and returns to ST31 via ST37. When the "three kinds of information" are not within the error range of an acceleration or deceleration value and cannot be regarded as substantially the same values (No at ST52), then the safety monitoring device 7a determines whether the "three kinds of information" fit within an acceleration or deceleration limit range (ST53). As a result, when the "three kinds of information" fit within the acceleration or deceleration limit range (Yes at ST53), the safety monitoring device 7a determines that the acceleration or deceleration value of the motor 4 is a normal acceleration or deceleration value and returns to ST31 via ST37. When the "three kinds of information" do not fit within the acceleration or deceleration limit range (No at ST53), the safety monitoring device 11a performs the processing at ST39 and ends this procedure. When the motor rotation state estimation information is not the acceleration or deceleration estimation value (No at ST05), like the safety monitoring device 11a of the motor control apparatus 3a, the safety monitoring device 7a returns to ST01 and repeats the monitoring operation explained above.

Like the safety monitoring device 11a, the safety monitoring device 7a is configured to perform, when performing the processing at ST39, determinations of (a) to (e) explained below for each two kinds of information of the "three kinds of information" to specify an apparatus that causes abnormality and display the apparatus on, for example, the monitoring panel of the host controller 2.

(a) When the motor rotation state estimation information captured from the motor control apparatus 3a and the output operation command can be regarded as the same within the error range, the safety monitoring device 7a determines that the detector 5 is out of order. (b) When the motor rotation state estimation information captured from the motor control apparatus 3a and the detected motor position captured from the motor control apparatus 3a or the motor position calculated from the detected motor speed can be regarded as the same within the error range, the safety monitoring device 7a determines that abnormality has occurred in the output operation command. (c) When the motor rotation state estimation information captured from the motor control apparatus 3a and the detected motor speed captured from the motor control apparatus 3a or the motor speed calculated from the detected motor position can be regarded as the same within the error range, the safety monitoring device 7a determines that abnormality has occurred in the output operation command. (d) When the output operation command and the detected motor position captured from the motor control apparatus 3a or the motor position calculated from the detected motor speed can be regarded as the same within the error range, the safety monitoring device 7a determines that abnormality has occurred in the current detecting circuit 9. (e) When the output operation command and the detected motor speed captured from the motor control apparatus 3a or the motor speed calculated from the detected motor position can be regarded as the same within the error range, the safety monitoring device 7a determines that abnormality has occurred in the current detecting circuit 9.

As explained above, according to the first embodiment, when the motor control apparatus is the type for subjecting a motor with a detector to driving control, the host controller can also perform safety monitoring for the motor control apparatus. Therefore, it is possible to realize a practical effect of safety monitoring of the motor control system. Then, estimation information to be monitored in the motor rotation state estimation information is set, three kinds of information including an operation command corresponding to the estimation information, a detected motor position, and detected motor speed are set as monitoring information, and a motor operation state is multiply monitored. Therefore, it is possible to improve reliability of safety monitoring. Safety monitoring can be performed without causing an addition or a change in the configuration in the past. Therefore, additional wiring is unnecessary and it is possible to shift to a motor control system with high safety while keeping the configuration in the past.

Second Embodiment

Figure 8:
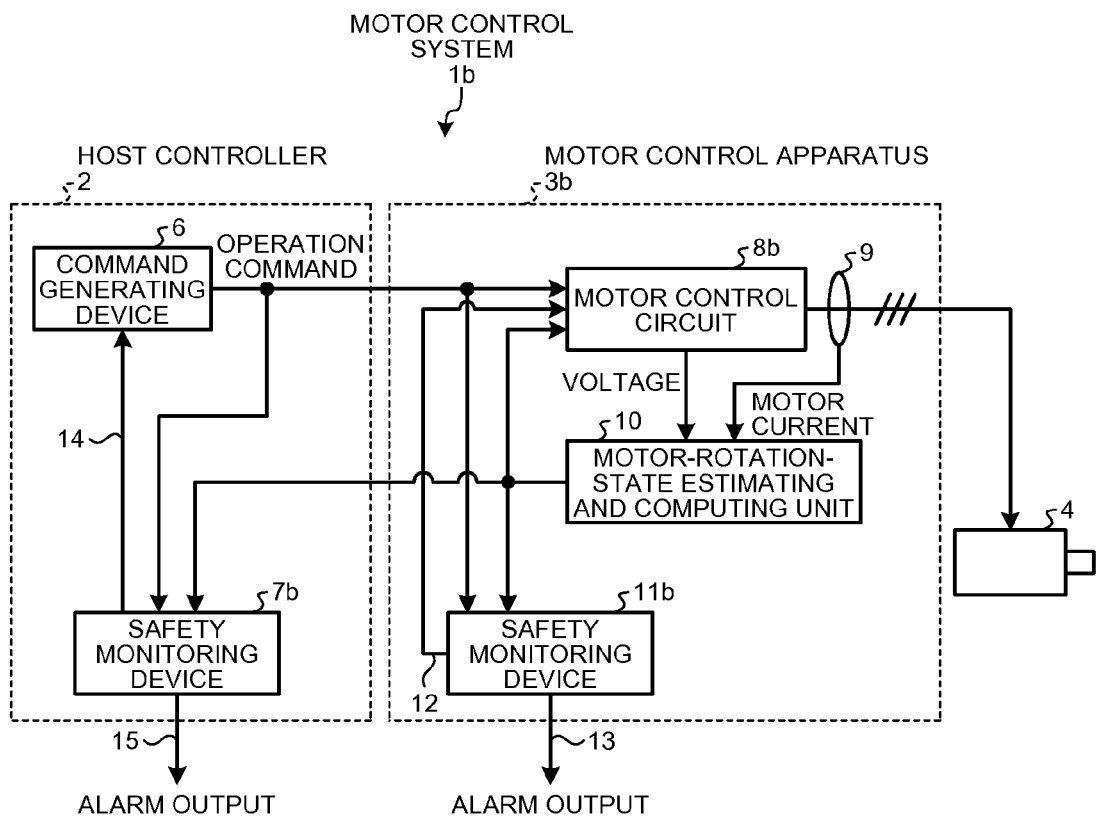
FIG. 8 is a block diagram of an overall configuration of a motor control system according to a second embodiment of the present invention.

FIG. 8 is a block diagram of an overall configuration of a motor control system according to a second embodiment of the present invention. In FIG. 8, components same as or equivalent to the components shown in FIG. 1 (the first embodiment) are denoted by the same reference numerals and signs. Here, sections related to the second embodiment are mainly explained.

In FIG. 8, a motor control system 1b according to the second embodiment includes the host controller 2 and a motor control apparatus 3b, the reference sign of which is changed. As in the first embodiment, the motor control system 1b is a servo system. Therefore, the motor control apparatus 3b is a servo amplifier. Position detectors and speed detectors are not arranged in the motors 4 of the various machines.

In the host controller 2, the command generating device 6 shown in FIG. 1 and a safety monitoring device 7b, the reference sign of which is changed, are shown. In the motor control apparatus 3b, the current detecting circuit 9 and the motor-rotation-state estimating and computing unit 10 shown in FIG. 1 and a motor control circuit 8b and a safety monitoring device 11b, the reference signs of which are changed, are shown.

In the motor control apparatus 3b, the motor control circuit 8b drives the motor 4 based on an operation command from the host controller 2 and an estimated position and estimated speed of the motor 4 estimated based on an electric current and a voltage to the motor 4.

Each of the safety monitoring devices 7b and 11b multiply monitors, in the three control modes, a safety state of the motor control apparatus 3b using two kinds of information, i.e., motor rotation state estimation information output by the motor-rotation-state estimating and computing unit 10 and an operation command output by the command generating device 6.

The safety monitoring devices 7b and 11b include, concerning these two kinds of information, for each of the three control modes, a table in which an error range is stored and a table in which a limit range is stored. The safety monitoring devices 7b and 11b check whether the two kinds of information are consistent or inconsistent and whether the two kinds of information are within limit ranges referring to these tables and output the monitoring result signals 12 and 14. The monitoring result signals 12 and 14 are input to the motor control circuit 8b and the command generating device 6 as control signals. The motor control circuit 8b and the command generating device 6 continue operations when the monitoring result signals 12 and 14 indicate a normal state and stop the operations when the monitoring result signals 12 and 14 indicate an abnormal state. The safety monitoring devices 7b and 11b are configured to, when outputting the monitoring result signals 12 and 14 indicating the abnormal state, perform the alarm outputs 13 and 15 to an operation panel, a monitoring panel, or the like not shown in the figure and warn people around the system of occurrence of abnormality. As a method for the warning, there are buzzer sounding, lighting of an error lamp, or the like.

A safety monitoring method according to the second embodiment is explained with reference to FIGS. 9 to 14. In flowcharts shown in FIGS. 9 to 14, a procedure of an operation monitoring operation performed in any one of the three control modes is shown. In FIGS. 9 to 14, processing procedures same as or equivalent to the processing procedures shown in FIGS. 2 to 6 are denoted by the same signs.

Safety Monitoring Method in the Motor Control Apparatus 3b

Figure 9:
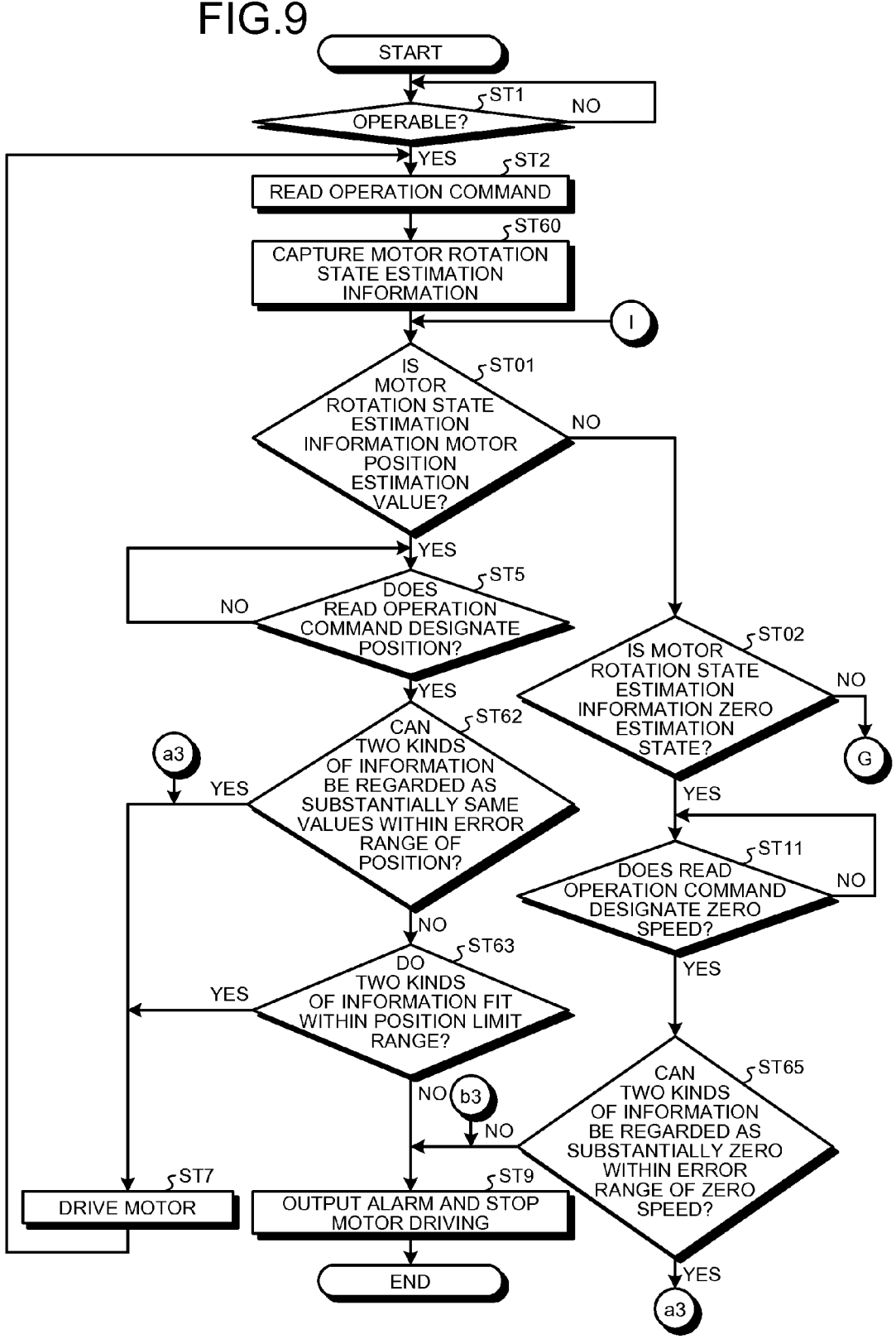
FIG. 9 is a flowchart for explaining a first safety monitoring method carried out by a motor control apparatus for the own apparatus.
Figure 10:
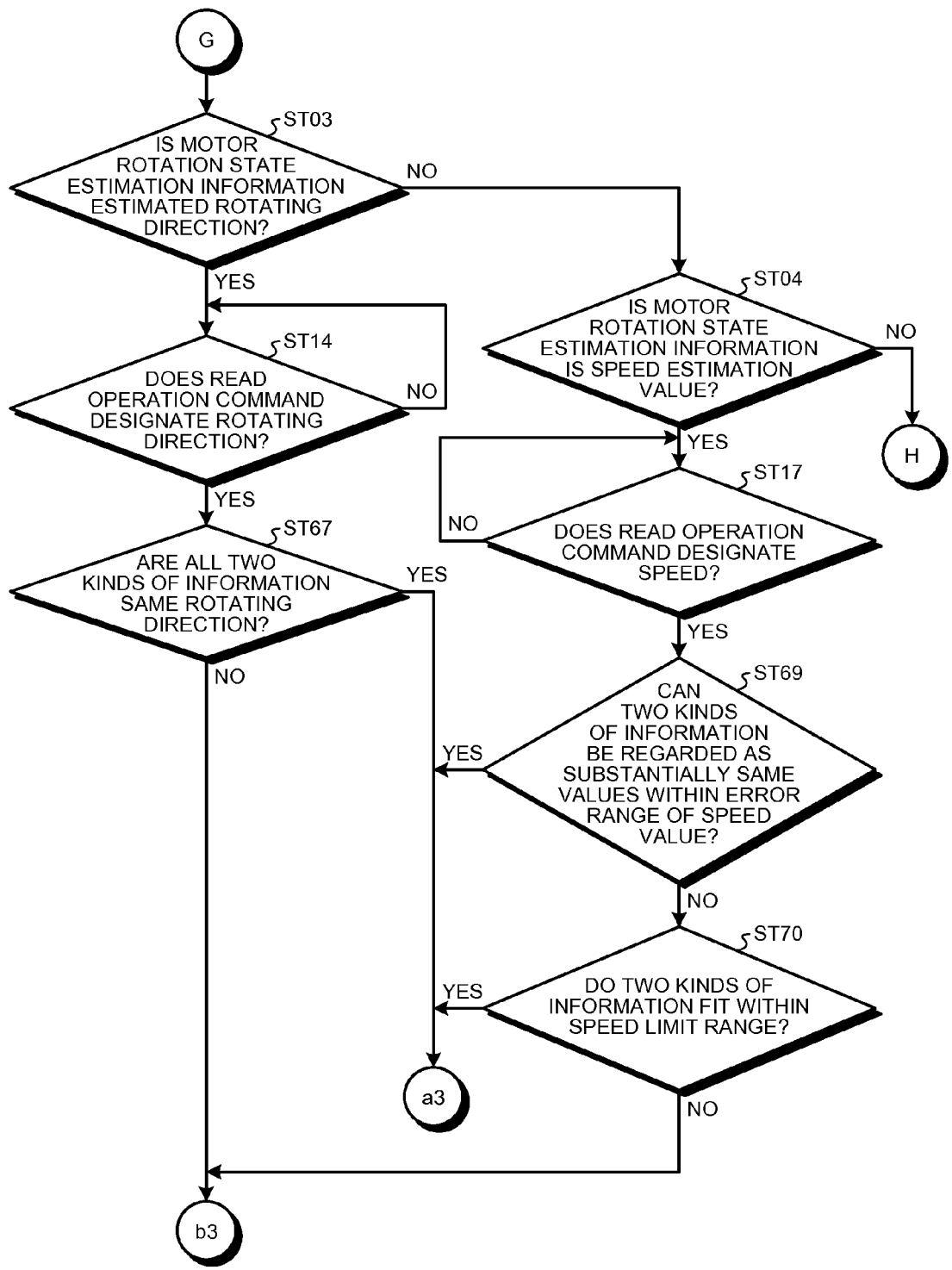
FIG. 10 is a flowchart for explaining a second safety monitoring method carried out by the motor control apparatus for the own apparatus.
Figure 11:
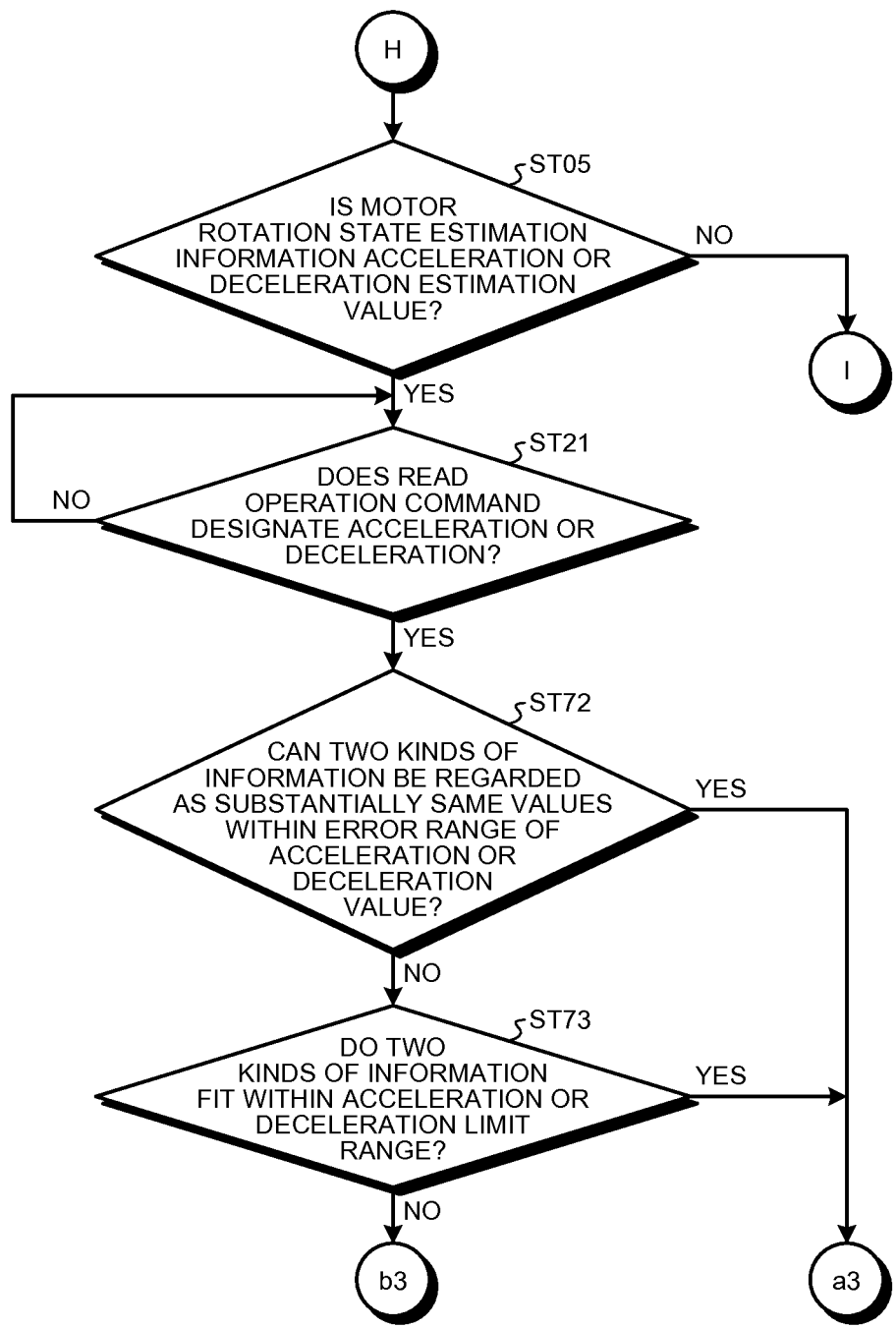
FIG. 11 is a flowchart for explaining a third safety monitoring method carried out by the motor control apparatus for the own apparatus.

FIGS. 9 to 11 are flowcharts for explaining a safety monitoring method carried out by the motor control apparatus 3b for the own apparatus. In FIGS. 9 to 11, when the motor control apparatus 3b is in an operable state (Yes at ST1), the host controller 2 outputs an operation command corresponding to a control mode to the motor control apparatus 3b. Therefore, the safety monitoring device 11b reads the operation command from the host controller 2 (ST2). In parallel, the safety monitoring device 11b captures motor rotation state estimation information output by the motor-rotation-state estimating and computing unit 10 (ST60).

Like the safety monitoring device 11a, the safety monitoring device 11b determines whether an operation state of the motor 4 is normal respectively (1) when the captured motor rotation state estimation information is a motor position estimation value (Yes at ST01), (2) when the captured motor rotation state estimation information is a zero speed estimation speed (Yes at ST02), (3) when the captured motor rotation state estimation information is an estimated rotating direction (Yes at ST03), (4) when the captured motor rotation state estimation information is a speed estimation value (Yes at ST4), and (5) when the captured motor rotation state estimation information is an acceleration or deceleration estimation value (Yes at ST05). The safety monitoring device 11b repeats the determination. The determinations in the steps are explained below in order.

(1) When the motor rotation state estimation information is the motor position estimation value (Yes at ST01), the safety monitoring device 11b confirms that the read operation command designates a position (Yes at ST5) and determines whether "two kinds of information" including the motor position estimation value and the position designated by the read operation command can be regarded as substantially the same values within an error range of a position (ST62). As a result, when the "two kinds of information" can be regarded as substantially the same values (Yes at ST62), the safety monitoring device 11b determines that the position of the motor 4 is a normal position and returns to ST2 via ST7. When the "two kinds of information" cannot be regarded as substantially the same values (No at ST62), the safety monitoring device 11b determines whether the "two kinds of information" fit within a position limit range (ST63). As a result, when the "two kinds of information" fit within the position limit range (Yes at ST63), the safety monitoring device 11b determines that the position of the motor 4 is the normal position and returns to ST2 via ST7. When the "two kinds of information" do not fit within the position limit range (No at ST63), the safety monitoring device 11b performs processing at ST9 and ends this procedure. Details of the processing at ST7 and ST9 are as explained above.

(2) When the motor rotation state estimation information is the zero speed estimation state (Yes at ST02), the safety monitoring device 11b confirms that the read operation command designates zero speed (Yes at ST11) and determines whether "two kinds of information" including the zero speed estimation state and the zero speed designated by the read operation command can be regarded as substantially zero within an error range of zero speed (ST65). As a result, when the "two kinds of information" can be regarded as substantially zero within the error range of zero speed (Yes at ST65), the safety monitoring device 11b determines that a stop state of the motor 4 is a normal stop state and returns to ST2 via ST7. When the "two kinds of information" are not within the error range of zero speed and cannot be regarded as substantially zero (No at ST65), the safety monitoring device 11b performs the processing at ST9 and ends this procedure.

(3) When the motor rotation state estimation information is the estimated rotating direction (Yes at ST03), the safety monitoring device 11b confirms that the read operation command designates a rotating direction (Yes at ST14) and determines whether all of "two kinds of information" including the estimated rotating direction and the rotating direction designated by the read operation command are the same rotating direction (ST67). As a result, when all of the "two kinds of information" are the same rotating direction (Yes at ST67), the safety monitoring device 11b determines that the rotating direction of the motor 4 is a normal rotating direction and returns to ST2 via ST7. When all of the "two kinds of information" are not the same rotating direction (No at ST67), the safety monitoring device 11b performs the processing at ST9 and ends this procedure.

(4) When the motor rotation state estimation information is the speed estimation value (Yes ST04), the safety monitoring device 11b confirms that the read operation command designates speed (Yes at ST17) and determines whether "two kinds of information" including the speed estimation value and a value of the speed designated by the read operation command can be regarded as substantially the same values within an error range of a speed value (ST69). As a result, when the "two kinds of information" can be regarded as substantially the same values within the error range of a speed value (Yes at ST69), then the safety monitoring device 11b determines that a speed value of the motor 4 is a normal speed value and returns to ST2 via ST7. When the "two kinds of information" are not within the error range of a speed value and cannot be regarded as substantially the same values (No at ST69), the safety monitoring device 11b determines whether the "two kinds of information" fit within a speed limit range (ST70). As a result, when the "two kinds of information" fit within the speed limit range (Yes at ST70), the safety monitoring device 11b determines that the speed value of the motor 4 is the normal speed value and returns to ST2 via ST7. When the "two kinds of information" do not fit within the speed limit range (No at ST70), the safety monitoring device 11b performs the processing at ST9 and ends this procedure.

(5) When the motor rotation state estimation information is the acceleration or deceleration estimation value (Yes at ST05), the safety monitoring device 11b confirms that the read operation command designates acceleration or deceleration (Yes at ST21) and determines whether "two kinds of information" including the acceleration or deceleration estimation value and a value of the acceleration or deceleration designated by the read operation command can be regarded as substantially the same values within an error range of an acceleration or deceleration value (ST72). As a result, when the "two kinds of information" can be regarded as substantially the same values within the error range of an acceleration or deceleration value (Yes at ST72), the safety monitoring device 11*b* determines that an acceleration or deceleration value of the motor 4 is a normal acceleration or deceleration value and returns to ST2 via ST7. When the "two kinds of information" are not within the error range of an acceleration or deceleration value and cannot be regarded as substantially the same values (No at ST72), then the safety monitoring device 11*b* determines whether the "two kinds of information" fit within an acceleration or deceleration limit range (ST73). As a result, when the "two kinds of information" fit within the acceleration or deceleration limit range (Yes at ST73), the safety monitoring device 11*b* determines that the acceleration or deceleration value of the motor 4 is a normal acceleration or deceleration value and returns to ST2 via ST7. When the "two kinds of information" do not fit within the acceleration or deceleration limit range (No at ST73), the safety monitoring device 11*b* performs the processing at ST9 and ends this procedure. When the motor rotation state estimation information is not the acceleration or deceleration estimation value (No at ST05), the safety monitoring device 11*b* returns to ST01 and repeats the monitoring operation explained above.

Safety Monitoring Method Carried Out by the Host Controller 2

Figure 12:
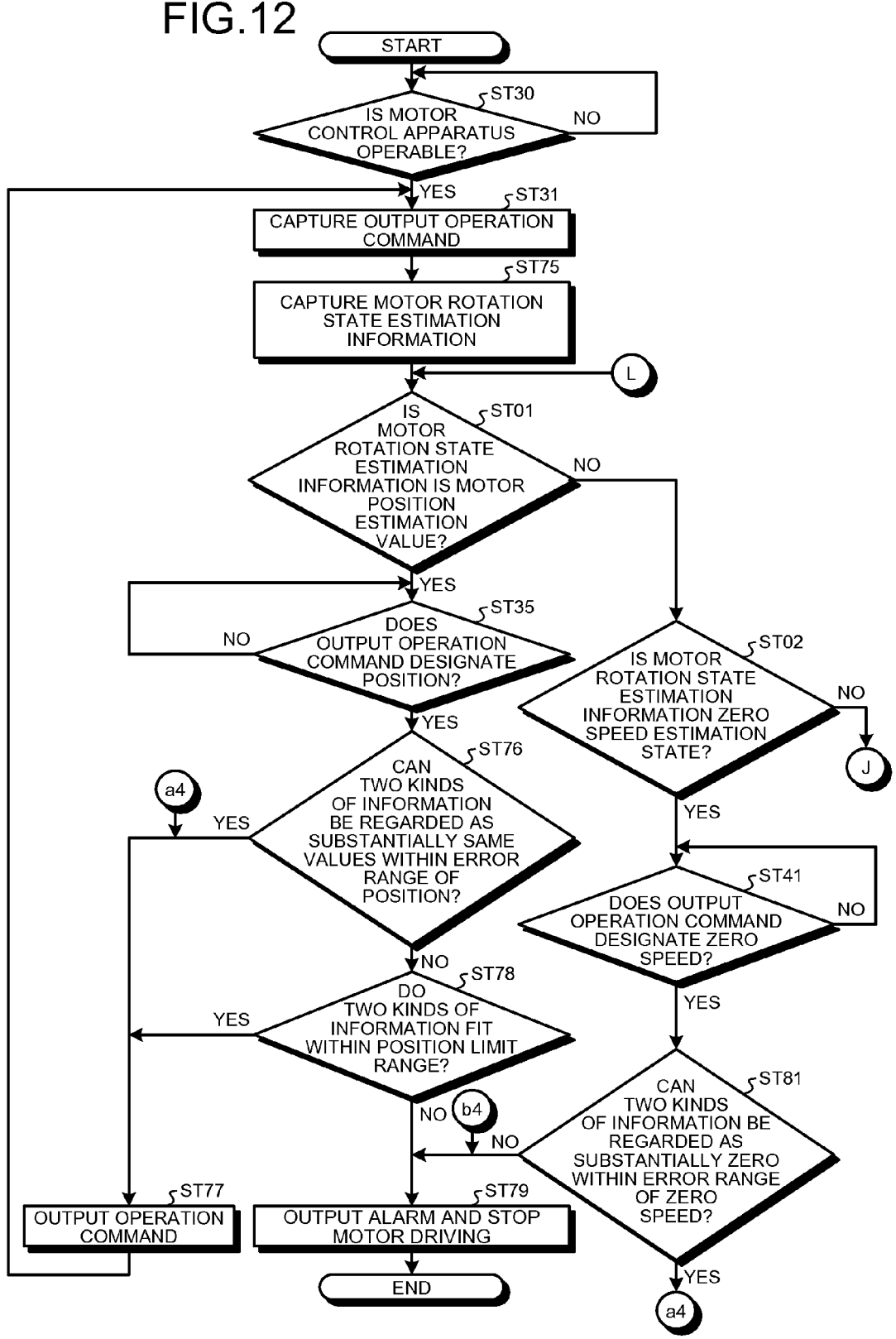
FIG. 12 is a flowchart for explaining a first safety monitoring method with which a host controller carries out safety monitoring for the motor control apparatus.
Figure 13:
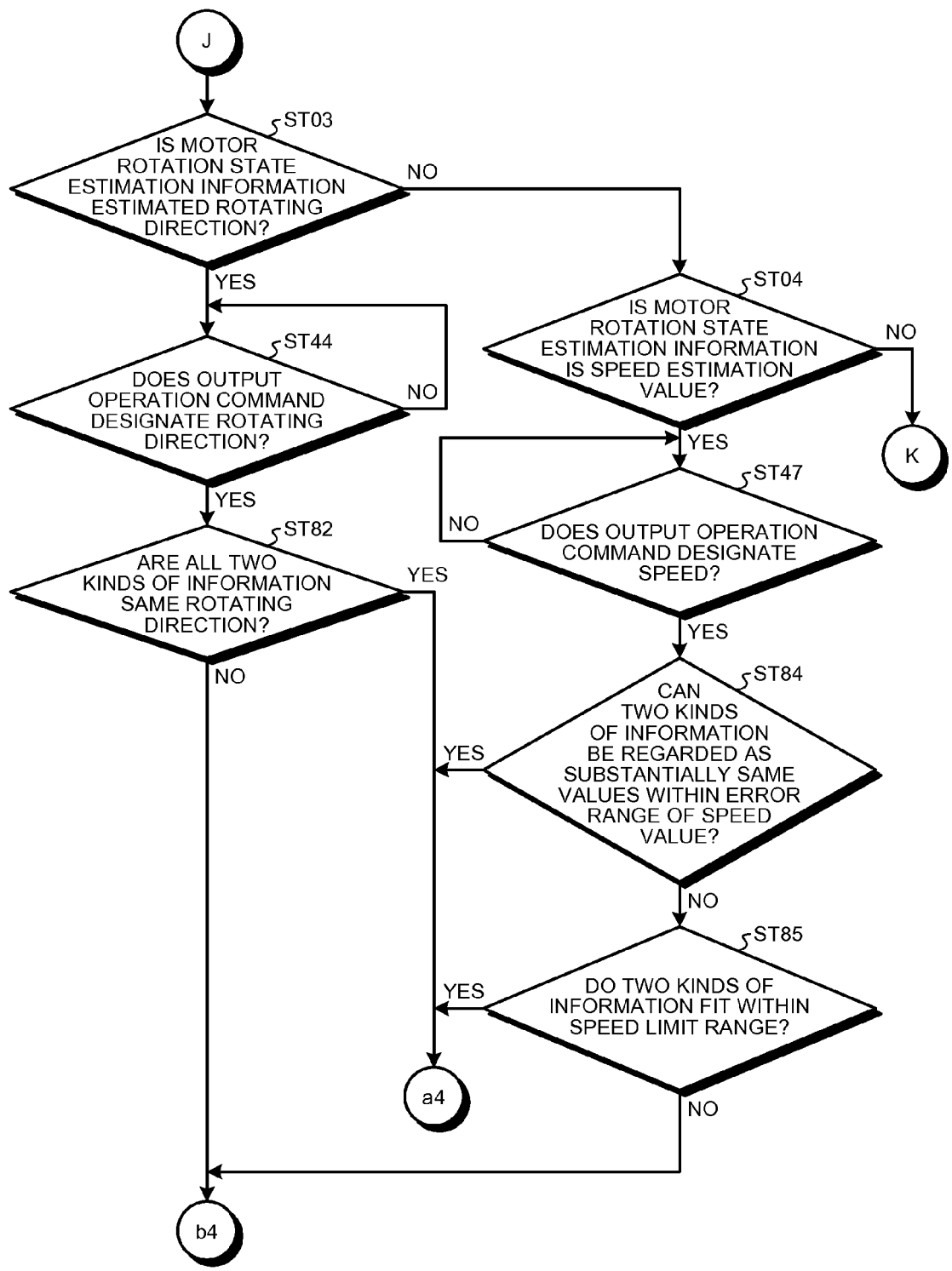
FIG. 13 is a flowchart for explaining a second safety monitoring method with which the host controller carries out safety monitoring for the motor control apparatus.

FIGS. 12 to 14 are flowcharts for explaining a safety monitoring method with which the host controller 2 carries out safety monitoring for the motor control apparatus 3*b*. In FIGS. 12 to 14, the host controller 2 confirms that the motor control apparatus 3*b* is in the operable state (Yes at ST30) and outputs an operation command corresponding to a control mode to the motor control apparatus 3*b*. Therefore, the safety monitoring device 7*b* captures the output operation command (ST31). In parallel, the safety monitoring device 7*b* captures, from the motor control apparatus 3*b*, motor rotation state estimation information output by the motor-rotation-state estimating and computing unit 10 (ST75).

The safety monitoring device 7*b* determines, with a method same as the method carried out by the safety monitoring device 11*b*, whether an operation state of the motor 4 is normal respectively (1) when the motor rotation state estimation information captured from the motor control apparatus 3*b* is a motor position estimation value (Yes at ST01), (2) when the captured motor rotation state estimation information is a zero speed estimation speed (Yes at ST02), (3) when the captured motor rotation state estimation information is an estimated rotating direction (Yes at ST03), (4) when the captured motor rotation state estimation information is a speed estimation value (Yes at ST4), and (5) when the captured motor rotation state estimation information is an acceleration or deceleration estimation value (Yes at ST05). The safety monitoring device 7*b* repeats the determination. The determinations in the steps are explained below in order.

(1) When the motor rotation state estimation information captured from the motor control apparatus 3*b* is the motor position estimation value (Yes at ST01), the safety monitoring device 7*b* confirms that the output operation command designates a position (Yes at ST35) and determines whether "two kinds of information" including the motor position estimation value captured from the motor control apparatus 3*b* and the position designated by the output operation command can be regarded as substantially the same values within an error range of a position (ST76). As a result, when the "two kinds of information" can be regarded as substantially the same values (Yes at ST76), the safety monitoring device 7*b* determines that the position of the motor 4 is a normal position and returns to ST31 via ST77. When the "two kinds of information" cannot be regarded as substantially the same values (No at ST76), the safety monitoring device 7*b* determines whether the "two kinds of information" fit within a position limit range (ST78). As a result, when the "two kinds of information" fit within the position limit range (Yes at ST78), the safety monitoring device 7*b* determines that the position of the motor 4 is the normal position and returns to ST31 via ST77. When the "two kinds of information" do not fit within the position limit range (No at ST78), the safety monitoring device 7*b* performs processing at ST79 and ends this procedure.

At ST77, the safety monitoring device 7*b* sets the monitoring result signal 14, which is output to the command generating device 6, to a signal level indicating a "normal state" and causes the command generating device 6 to continue the generation of an operation command. Consequently, the motor control apparatus 3*b* continues the operation of the motor 4. At ST79, the safety monitoring device 7*b* sets the monitoring result signal 14, which is output to the command generating device 6, to a signal level indicating an "abnormal state" and causes the command generating device 6 to stop the operation for generating an operation command. Consequently, the motor control apparatus 3*b* stops the operation of the motor 4. At the same time, the safety monitoring device 7*b* performs the alarm output 15 on, for example, a not-shown monitoring panel of the host controller 2.

(2) When the motor rotation state estimation information captured from the motor control apparatus 3*b* is the zero speed estimation state (Yes at ST02), the safety monitoring device 7*b* confirms that the output operation command designates zero speed (Yes at ST41) and determines whether "two kinds of information" including the zero speed estimation state captured from the motor control apparatus 3*b* and the zero speed designated by the output operation command can be regarded as substantially zero within an error range of zero speed (ST81). As a result, when the "two kinds of information" can be regarded as substantially zero within the error range of zero speed (Yes at ST81), the safety monitoring device 7*b* determines that a stop state of the motor 4 is a normal stop state and returns to ST31 via ST77. When the "two kinds of information" are not within the error range of zero speed and cannot be regarded as substantially zero (No at ST81), the safety monitoring device 7*b* performs the processing at ST79 and ends this procedure.

(3) When the motor rotation state estimation information captured from the motor control apparatus 3*b* is the estimated rotating direction (Yes at ST03), the safety monitoring device 7*b* confirms that the output operation command designates a rotating direction (Yes at ST44) and determines whether all of "two kinds of information" including the estimated rotating direction captured from the motor control apparatus 3*b* and the rotating direction designated by the output operation command are the same rotating direction (ST82). As a result, when all of the "two kinds of information" are the same rotating direction (Yes at ST82), the safety monitoring device 7*b* determines that the rotating direction of the motor 4 is a normal rotating direction and returns to ST31 via ST77. When all of the "two kinds of information" are not the same rotating direction (No at ST82), the safety monitoring device 11*b* performs the processing at ST79 and ends this procedure.

(4) When the motor rotation state estimation information captured from the motor control apparatus 3*b* is the speed estimation value (Yes ST04), the safety monitoring device 7*b* confirms that the output operation command designates speed (Yes at ST47) and determines whether "two kinds of information" including the speed estimation value captured from the motor control apparatus 3b and a value of the speed designated by the output operation command can be regarded as substantially the same values within an error range of a speed value (ST84). As a result, when the "two kinds of information" can be regarded as substantially the same values within the error range of a speed value (Yes at ST84), the safety monitoring device 7b determines that a speed value of the motor 4 is a normal speed value and returns to ST31 via ST77. When the "two kinds of information" are not within the error range of a speed value and cannot be regarded as substantially the same values (No at ST84), then the safety monitoring device 7b determines whether the "two kinds of information" fit within a speed limit range (ST85). As a result, when the "two kinds of information" fit within the speed limit range (Yes at ST85), the safety monitoring device 7b determines that the speed value of the motor 4 is the normal speed value and returns to ST31 via ST77. When the "two kinds of information" do not fit within the speed limit range (No at ST85), the safety monitoring device 7b performs the processing at ST79 and ends this procedure.

(5) When the motor rotation state estimation information captured from the motor control apparatus 3b is the acceleration or deceleration estimation value (Yes at ST05), the safety monitoring device 7b confirms that the output operation command designates acceleration or deceleration (Yes at ST51) and determines whether "two kinds of information" including the acceleration or deceleration estimation value captured from the motor control apparatus 3b and a value of the acceleration or deceleration designated by the output operation command can be regarded as substantially the same values within an error range of an acceleration or deceleration value (ST87). As a result, when the "two kinds of information" can be regarded as substantially the same values within the error range of an acceleration or deceleration value (Yes at ST87), the safety monitoring device 7b determines that an acceleration or deceleration value of the motor 4 is a normal acceleration or deceleration value and returns to ST31 via ST77. When the "two kinds of information" are not within the error range of an acceleration or deceleration value and cannot be regarded as substantially the same values (No at ST87), then the safety monitoring device 7b determines whether the "two kinds of information" fit within an acceleration or deceleration limit range (ST88). As a result, when the "two kinds of information" fit within the acceleration or deceleration limit range (Yes at ST88), the safety monitoring device 7b determines that the acceleration or deceleration value of the motor 4 is a normal acceleration or deceleration value and returns to ST31 via ST77. When the "two kinds of information" do not fit within the acceleration or deceleration limit range (No at ST88), the safety monitoring device 11b performs the processing at ST79 and ends this procedure. When the motor rotation state estimation information is not the acceleration or deceleration estimation value (No at ST05), like the safety monitoring device 11b of the motor control apparatus 3b, the safety monitoring device 7b returns to ST01 and repeats the monitoring operation explained above.

As explained above, according to the second embodiment, when the motor control apparatus is the type for subjecting a motor without a detector to driving control, the host controller can also perform safety monitoring for the motor control apparatus. Therefore, it is possible to realize a practical effect of safety monitoring of the motor control system. Then, estimation information to be monitored in the motor rotation state estimation information is set, two kinds of information including the estimated information and an operation command corresponding to the estimation information are set as monitoring information, and a motor operation state is multiply monitored. Therefore, it is possible to improve reliability of safety monitoring. As in the first embodiment, safety monitoring can be performed without causing an addition or a change in the configuration in the past. Therefore, additional wiring is unnecessary and it is possible to shift to a motor control system with high safety while keeping the configuration in the past.

In the first and second embodiments, the application example to the safety monitoring method in which the servo amplifier is used is explained. However, likewise, the present invention can be applied to a safety monitoring method in a motor control system in which an inverter device is used.

The motor control apparatuses in the first and second embodiments are the type for operating by receiving a position command, a speed command, and a torque command from the host controller 2. However, the safety monitoring method according to the present invention can be applied when a motor control apparatus is a built-in positioning type.

Specifically, the motor control apparatus of the built-in positioning type receives a target position and a startup signal from a host controller and generates, on the inside thereof, a position command including various command patterns for a position, speed, and torque. Therefore, the motor control apparatus is configured to output the generated position command to the host controller. Then, in the motor control apparatus of the built-in positioning type, the safety monitoring explained in detail above can be performed using the position command generated on the inside. The controller can perform the safety monitoring explained in detail above using the position command received from the motor control apparatus of the built-in positioning type.

INDUSTRIAL APPLICABILITY

As explained above, the motor control system and the safety monitoring method therefor according to the present invention are useful as a motor control system in which a host controller can also perform safety monitoring for a motor control apparatus without causing an addition or a change in the configuration in the past and a safety monitoring system for the motor control system are suitable for, in particular, a motor control system in which a servo amplifier is used and a safety monitoring method for the motor control system.

REFERENCE SIGNS LIST 1a, 1b motor control systems
2 host controller
3a, 3b, motor control apparatuses
4 motor
5 detector (position detector or speed detector)
6 command generating device
7a, 7b, 11a, 11b safety monitoring devices
8a, 8b motor control circuits
9 current detecting circuit

The invention claimed is:
1. A motor control system comprising:
a host controller configured to output an operation command;
a detector configured to detect a motor position or a motor speed of a motor, wherein detection information comprises:
a detected motor position being the motor position detected by the detector when the detector is a position detector, or being calculated from the motor speed detected by the detector when the detector is a speed detector; and a detected motor speed being the motor speed detected by the detector when the detector is the speed detector, or being calculated from the motor position detected by the detector when the detector is the position detector; and a motor control apparatus configured to drive the motor based on the detection information and the operation command from the host controller, wherein:

the host controller comprises a first safety monitoring unit configured to determine whether or not motor rotation state estimation information input from the motor control apparatus, the operation command output to the motor control apparatus, and the detection information are consistent with each other to determine whether an operation state of the motor is normal or not, and the motor control apparatus comprises:
- a motor-rotation-state estimating unit configured to output the motor rotation state estimation information estimated based on an electric current and a voltage to the motor; and
- a second safety monitoring unit configured to determine, whether or not the motor rotation state estimation information output by the motor-rotation-state estimating unit, the operation command from the host controller, and the detection information are consistent with each other to determine whether an operation state of the motor is normal or not.

2. The motor control system according to claim 1, wherein: the motor rotation state estimation information includes a motor position estimation value, and each of the first safety monitoring unit and the second safety monitoring unit determines that a motor position of the motor is normal, if the motor position estimation value, a position designated by the operation command, and the detected motor position are same within an error range or fit within a limit range.

3. The motor control system according to claim 1, wherein: the motor rotation state estimation information includes a zero speed estimation state, and each of the first safety monitoring unit and the second safety monitoring unit determines that a stop state of the motor is normal, if the zero speed estimation state, zero speed designated by the operation command, and the detected motor speed are zero within an error range.

4. The motor control system according to claim 1, wherein: the motor rotation state estimation information includes an estimated rotating direction, and each of the first safety monitoring unit and the second safety monitoring unit determines that a rotating direction of the motor is normal, if the estimated rotating direction, a rotating direction designated by the operation command, and a rotating direction obtained from the detected motor speed are same.

5. The motor control system according to claim 1, wherein: the motor rotation state estimation information includes a motor speed estimation value, and each of the first safety monitoring unit and the second safety monitoring unit determines that a motor speed of the motor is normal, if the motor speed estimation value, a speed value designated by the operation command, and the detected motor speed are same within an error range or fit within a limit range.

6. The motor control system according to claim 1, wherein: the motor rotation state estimation information includes a motor acceleration or deceleration estimation value, and each of the first safety monitoring unit and the second safety monitoring unit determines that an acceleration or deceleration value of the motor is normal, if the motor acceleration or deceleration estimation value, an acceleration or deceleration value designated by the operation command, and an acceleration or deceleration value obtained from the detected motor speed are same within an error range or fit with a limit range.

7. The motor control system according to claim 1, wherein each of the first safety monitoring unit and the second safety monitoring unit determines that abnormality occurs in the detector, if the operation state of the motor is determined to be abnormal while the motor rotation state estimation information and the operation command are consistent with each other.

8. The motor control system according to claim 1, wherein each of the first safety monitoring unit and the second safety monitoring unit determines that abnormality occurs in the operation command, if the operation state of the motor is determined to be abnormal while the motor rotation state estimation information and the detection information are consistent with each other.

9. The motor control system according to claim 1, wherein each of the first safety monitoring unit and the second safety monitoring unit determines that abnormality occurs in a current detection circuit detecting the electric current to the motor, if the operation state of the motor is determined to be abnormal while the operation command and the detection information are consistent with each other.

10. A motor control system comprising:
- a host controller configured to output an operation command; and
- a motor control apparatus configured to drive a motor based on an estimated position and estimated speed of a motor, which are estimated based on an electric current and a voltage to the motor, and the operation command from the host controller, wherein:

the host controller comprises a first safety monitoring unit configured to determine whether or not motor rotation state estimation information input from the motor control apparatus and the operation command output to the motor control apparatus are consistent with each other to determine whether an operation state of the motor is normal or not, and the motor control apparatus comprises:
- a motor-rotation-state estimating unit configured to output the motor rotation state estimation information estimated based on the electric current and the voltage to the motor; and
- a second safety monitoring unit configured to determine whether or not the motor rotation state estimation information output by the motor-rotation-state estimating unit and the operation command input from the host controller are consistent with each other to determine whether an operation state of the motor is normal or not.

11. The motor control system according to claim 10, wherein:
the motor rotation state estimation information comprises a motor position estimation value, and each of the first safety monitoring unit and the second safety monitoring unit determines that a motor position of the motor is normal, if the motor position estimation value and a position designated by the operation command are same within an error range or fit within a limit range.

12. The motor control system according to claim 10, wherein:

the motor rotation state estimation information includes a zero speed estimation state, and each of the first safety monitoring unit and the second safety monitoring unit determines that a stop state of the motor is normal, if the zero speed estimation state and zero speed designated by the operation command are zero within an error range.

13. The motor control system according to claim 10, wherein:
the motor rotation state estimation information comprises an estimated rotating direction, and
each of the first safety monitoring unit and the second safety monitoring unit determines that a rotating direction of the motor is normal, if the estimated rotating direction and a rotating direction designated by the operation command are same.

14. The motor control system according to claim 10, wherein:
the motor rotation state estimation information comprises a motor acceleration or deceleration estimation value, and
each of the first safety monitoring unit and the second safety monitoring unit determines that an acceleration or deceleration value of the motor is normal, if the motor acceleration or deceleration estimation value and an acceleration or deceleration value designated by the operation command are same within an error range or fit within a limit range.

15. A safety monitoring method in a motor control system, the motor control system comprising:
a host controller configured to output an operation command;
a detector configured to detect a motor position or a motor speed of a motor,
wherein detection information comprises:
a detected motor position being the motor position detected by the detector when the detector is a position detector, or being calculated from the motor speed detected by the detector when the detector is a speed detector; and
a detected motor speed being the motor speed detected by the detector when the detector is the speed detector, or being calculated from the motor position detected by the detector when the detector is the position detector; and
a motor control apparatus configured to drive the motor based on the detection information and the operation command from the host controller,
the safety monitoring method comprising:
estimating, by the motor control apparatus, motor rotation state estimation information based on an electric current and a voltage to the motor; and
determining, by each of the host controller and the motor control apparatus, whether or not the motor rotation state estimation information, the operation command, and the detection information are consistent with each other to determine whether an operation state of the motor is normal or not.

16. The safety monitoring method according to claim 15, wherein:
the motor rotation state estimation information includes motor position estimation value, and
the determining includes: determining that a motor position of the motor is normal, if the motor position estimation value, a position designated by the operation command, and the detected motor position are same within an error range or fit within a limit range.

17. The safety monitoring method according to claim 15, wherein:
the motor rotation state estimation information includes a zero speed estimation state, and
the determining includes: determining that a stop state of the motor is normal, if the zero speed estimation state, zero speed designated by the operation command, and the detected motor speed are zero within an error range.

18. The safety monitoring method according to claim 15, wherein:
the motor rotation state estimation information includes an estimated rotating direction, and
the determining comprises: determining that a rotating direction of the motor is normal, if the estimated rotating direction, a rotating direction designated by the operation command, and a rotating direction obtained from the detected motor speed are same.

19. The safety monitoring method for the motor control system according to claim 15, wherein:
the motor rotation state estimation information includes a motor speed estimation value, when all of the motor speed estimation value, and
the determining comprises: determining that a motor speed of the motor is normal, if the motor speed estimation value, a speed value designated by the operation command, and the detected motor speed are same within an error range or fit within a limit range.

20. The safety monitoring method for the motor control system according to claim 15, wherein:
the motor rotation state estimation information includes a motor acceleration or deceleration estimation value, and
the determining comprises: determining that an acceleration or deceleration value of the motor is normal, if the motor acceleration or deceleration estimation value, an acceleration or deceleration value designated by the operation command, and an acceleration or deceleration value obtained from the detected motor speed are same within an error range or fit within a limit range.

21. The safety monitoring method according to claim 15, wherein the determining comprises: determining that abnormality occurs in the detector, if the operation state of the motor is determined to be abnormal while the motor rotation state estimation information and the operation command are consistent with each other.

22. The safety monitoring method for the motor control system according to claim 15, wherein the determining comprises: determining that abnormality occurs in the operation command, if the operation state of the motor is determined to be abnormal while the motor rotation state estimation information and the detection information are consistent with each other.

23. The safety monitoring method for the motor control system according to claim 15, wherein the determining comprises: determining that abnormality occurs in a current detection circuit detecting the electric current to the motor, if the operation state of the motor is determined to be abnormal while the operation command and the detection information are consistent with each other.

24. A safety monitoring method in a motor control system, the motor control system comprising:
a host controller configured to output an operation command; and
a motor control apparatus configured to drive a motor based on an estimated position and estimated speed of a motor, which are estimated based on an electric current and a voltage to the motor, and the operation command from the host controller, the safety monitoring method:

estimating, by the motor control apparatus, motor rotation state estimation information based on the electric current and the voltage to the motor; and determining, by each of the host controller and the motor control apparatus, whether or not the motor rotation state estimation information and the operation command are consistent with each other to determine whether an operation state of the motor is normal or not.

25. The safety monitoring method according to claim 24, wherein:

the motor rotation state estimation information includes a motor position estimation value, and the determining includes: determining that a motor position of the motor is normal, if the motor position estimation value and a position designated by the operation command are same within an error range or fit within a limit range.

26. The safety monitoring method according to claim 24, wherein:

the motor rotation state estimation information includes a zero speed estimation state, and the determining includes: determining that a stop state of the motor is normal, if the zero speed estimation state and zero speed designated by the operation command are zero within an error range.

27. The safety monitoring method according to claim 24, wherein:

the motor rotation state estimation information includes an estimated rotating direction, and the determining comprises: determining that a rotating direction of the motor is normal, if the estimated rotating direction and a rotating direction designated by the operation command are same.

28. The safety monitoring method according to claim 24, wherein:

the motor rotation state estimation information includes a motor speed estimation value, and the determining comprises: determining that a motor speed of the motor is normal, if the motor speed estimation value and a speed value designated by the operation command are same within an error range or fit within a limit range.

29. The safety monitoring method according to claim 24, wherein:

the motor rotation state estimation information includes a motor acceleration or deceleration estimation value, and the determining comprises: determining that an acceleration or deceleration value of the motor is normal, if the motor acceleration or deceleration estimation value and an acceleration or deceleration value designated by the operation command are same within an error range or fit within a limit range.

30. The motor control system according to claim 10, wherein the motor rotation state estimation information includes a motor speed estimation value, and each of the first safety monitoring unit and the second safety monitoring unit determines that a motor speed of the motor is normal, if the motor speed estimation value and a speed value designated by the operation command are same within an error range or fit within a limit range.

* * * * *